(12) United States Patent
Hirayama et al.

(10) Patent No.: US 7,875,373 B2
(45) Date of Patent: Jan. 25, 2011

(54) PERPENDICULAR MAGNETIC RECORDING MEDIUM AND MAGNETIC STORAGE APPARATUS USING THE SAME

(75) Inventors: Yoshiyuki Hirayama, Tokyo (JP); Ichiro Tamai, Kanagawa (JP); Reiko Arai, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 38 days.

(21) Appl. No.: 11/985,310

(22) Filed: Nov. 13, 2007

(65) Prior Publication Data

US 2008/0113221 A1 May 15, 2008

(30) Foreign Application Priority Data

Nov. 14, 2006 (JP) .............................. 2006-307884

(51) Int. Cl.
*G11B 5/65* (2006.01)
(52) U.S. Cl. .................... 428/836.2; 428/800; 428/810; 428/836
(58) Field of Classification Search ....... 428/800–848.9
See application file for complete search history.

(56) References Cited

U.S. PATENT DOCUMENTS

| | | | |
|---|---|---|---|
| 5,587,235 A | 12/1996 | Suzuki et al. | |
| 6,555,248 B1 | 4/2003 | Takahashi et al. | |
| 7,147,942 B2 | 12/2006 | Uwazumi et al. | |
| 2006/0057431 A1 | 3/2006 | Tamai et al. | |
| 2006/0088737 A1 | 4/2006 | Hirayama et al. | |
| 2006/0204791 A1 | 9/2006 | Sakawaki et al. | |

FOREIGN PATENT DOCUMENTS

JP 2005-141825 A 6/2005

OTHER PUBLICATIONS

European Search Report dated Dec. 20, 2007 for European patent application EP07015725.

*Primary Examiner*—Mark Ruthkosky
*Assistant Examiner*—Linda Chau
(74) *Attorney, Agent, or Firm*—Zilka-Kotab, PC

(57) ABSTRACT

Embodiments in accordance with the present invention help to obtain a perpendicular magnetic recording medium having a granular structure, excellent recording/reproducing properties, and excellent durability. According to one embodiment, a recording layer includes a layer which has crystal grains mainly composed of cobalt and crystal grain boundaries mainly composed of the oxide; the oxygen content of the recoding layer is changed in the film thickness direction; the oxygen content in the area in the vicinity of the interface between the recording layer and the intermediate layer is made lower than the oxygen content in the area in the vicinity of the center of the recording layer; and the oxygen content in the area in the vicinity of the interface between the recording layer and the protective layer is made lower than the oxygen content in the area in the vicinity of the center of the recording layer.

16 Claims, 13 Drawing Sheets

PERPENDICULAR MAGNETIC RECORDING MEDIUM AND MAGNETIC STORAGE APPARATUS USING THE SAME

CROSS-REFERENCE TO RELATED APPLICATION

The instant nonprovisional patent application claims priority to Japanese Patent Application No. 2006-307884 filed Nov. 14, 2006 and which is incorporated by reference in its entirety herein for all purposes.

BACKGROUND OF THE INVENTION

In recent years, hard disk drives have been mounted not only in personal computers but also in domestic electrical products, and there is strong demand for a hard disk drive where the size is smaller than that of the prior arts and where a large capacity recording is possible. In addition, shock resistance has been required in order to mount it inside mobile products such as music players, cellular telephones, and video cameras. In order to achieve large capacity, a perpendicular magnetic recording method is starting to be adopted in place of a conventional longitudinal magnetic recording method. A high density recording state is stable because adjacent magnetizations do not oppose each other in a perpendicular magnetic recording, so that it is considered to be fundamentally suited for high density recording. Moreover, the recording efficiency can be improved by combining a single pole type recording head with a perpendicular magnetic recording medium having a soft-magnetic underlayer. In order to improve the shock resistance, it is important to decrease the impact force by making the head light. However, it is also important to develop a medium with high strength. It is necessary to discuss the material and the combination constituting the medium from the viewpoint of not only the recording/reproducing properties but also the strength of the medium.

A granular type material where oxygen or an oxide is added to a CoCrPt alloy is used for the recording layer of a perpendicular magnetic recording medium. A granular type recording layer includes magnetic grains composed of a CoCrPt alloy and non-magnetic oxide grain boundaries surrounding them. Low noise is achieved by decreasing the exchange coupling between the magnetic grains by using an effect where oxides segregate to the grain boundaries. Therefore, since the formation state of the oxide grain boundaries controls the noise properties, an amount of oxygen and oxide to be included in the recording layer is important.

As a perpendicular magnetic recording medium having a granular type recording layer, for instance, Japanese Patent Publication No. 2003-178413 ("Patent Document 1") discloses a perpendicular magnetic recording medium where the volume of the non-magnetic grain boundaries which are mainly composed of oxide is 15% or more and 40% or less of the volume of the whole magnetic layer. In order to secure the low noise properties by controlling the segregation structure of the granular magnetic layer, it is described that controlling the amount of oxide contained in the magnetic layer is important. Moreover, Japanese Patent Publication No. 2004-310910 ("Patent Document 2") discloses a granular type perpendicular magnetic recording medium where a magnetic layer which does not include the oxide is laminated over a magnetic layer including the oxide. It is described that compatibility between recording/reproducing properties and resistance to thermal fluctuations is possible because of such a configuration of the magnetic layer. Japanese Patent Publication No. 2005-141825 ("Patent Document 3") describes a granular type magnetic recording medium where the oxide content in the magnetic layer continuously decreases in the direction from the substrate to the film surface. It is described that noise reduction is possible by achieving such a distribution of the oxide content. Japanese Patent Publication No. 2006-120290 ("Patent Document 4") describes a technology for improving the recording/reproducing properties while ensuring the flyability and the durability of the head in a granular type perpendicular magnetic recording medium. In this patent document, a medium is proposed, which is characterized by a shape where the diameter of the protective layer side part is greater than the diameter of the intermediate layer side part with regard to the columnar grains in the magnetic recording layer.

With regard to a granular type perpendicular magnetic recording medium, it is reported that the recording/reproducing properties and the resistance to thermal fluctuations are improved by controlling the oxygen content and the oxide, but there has not been enough discussion from the viewpoint of shock resistance.

A contact mark, a so-called scratch, may be formed on the surface of the medium in the hard disk drive when the head rotating at high speed contacts the surface of the medium. In the part of the medium where a scratch is formed, not only has the shape changed but also magnetic information has been lost in many cases or it cannot be written, so that reading becomes impossible. Therefore, in order to obtain a magnetic storage apparatus with high impact resistance and high reliability, it is necessary to develop a magnetic recording medium with excellent durability where it is difficult for a scratch to form if it contacts the head. In order to prevent a magnetic recording medium from forming a scratch and to improve the durability, the protective layer has been improved up to now. However, even if a hard protective layer is used, a scratch is easily formed caused by deformation of the soft layer when a soft layer exists underneath it. Specifically, in order to prevent the formation of a scratch and to improve the durability it is necessary to discuss not only the protective layer, but all layers and combinations thereof included in the medium. Specifically, since a granular type recording layer does not have sufficient strength, there is a concern that it caused a stating point of deformation, but there has not been enough discussion concerning strength up to now.

In order to decrease the medium noise in a perpendicular magnetic recording medium where the recording layer has a granular structure including a plurality of columnar grains and crystal grain boundaries containing the oxide, a means is effective where additions of the oxide forming the grain boundaries of the recording layer is increased and the exchange coupling between the magnetic grains is reduced. However, when such a means is taken, not only is the flyability deteriorated by an increase in the surface roughness of the granular layer, but also formation of a scratch occurs frequently because deformation is easily produced where the granular layer becomes the starting point. On the other hand, when addition of oxide is drastically decreased, although it is expected that the strength of the granular layer increases, it is impossible to obtain the recording/reproducing properties sufficient for high density recording.

BRIEF SUMMARY OF THE INVENTION

Embodiments in accordance with the present invention help to obtain a perpendicular magnetic recording medium having a granular structure, excellent recording/reproducing properties, and excellent durability. According to one embodiment, a recording layer includes a layer which has crystal grains mainly composed of cobalt and crystal grain boundaries mainly composed of the oxide; the oxygen content of the recoding layer is changed in the film thickness direction; the oxygen content in the area in the vicinity of the interface between the recording layer and the intermediate layer is made lower than the oxygen content in the area in the vicinity of the center of the recording layer; and the oxygen content in the area in the vicinity of the interface between the recording layer and the protective layer is made lower than the oxygen content in the area in the vicinity of the center of the recording layer.

DETAILED DESCRIPTION OF THE INVENTION

Figure 1:
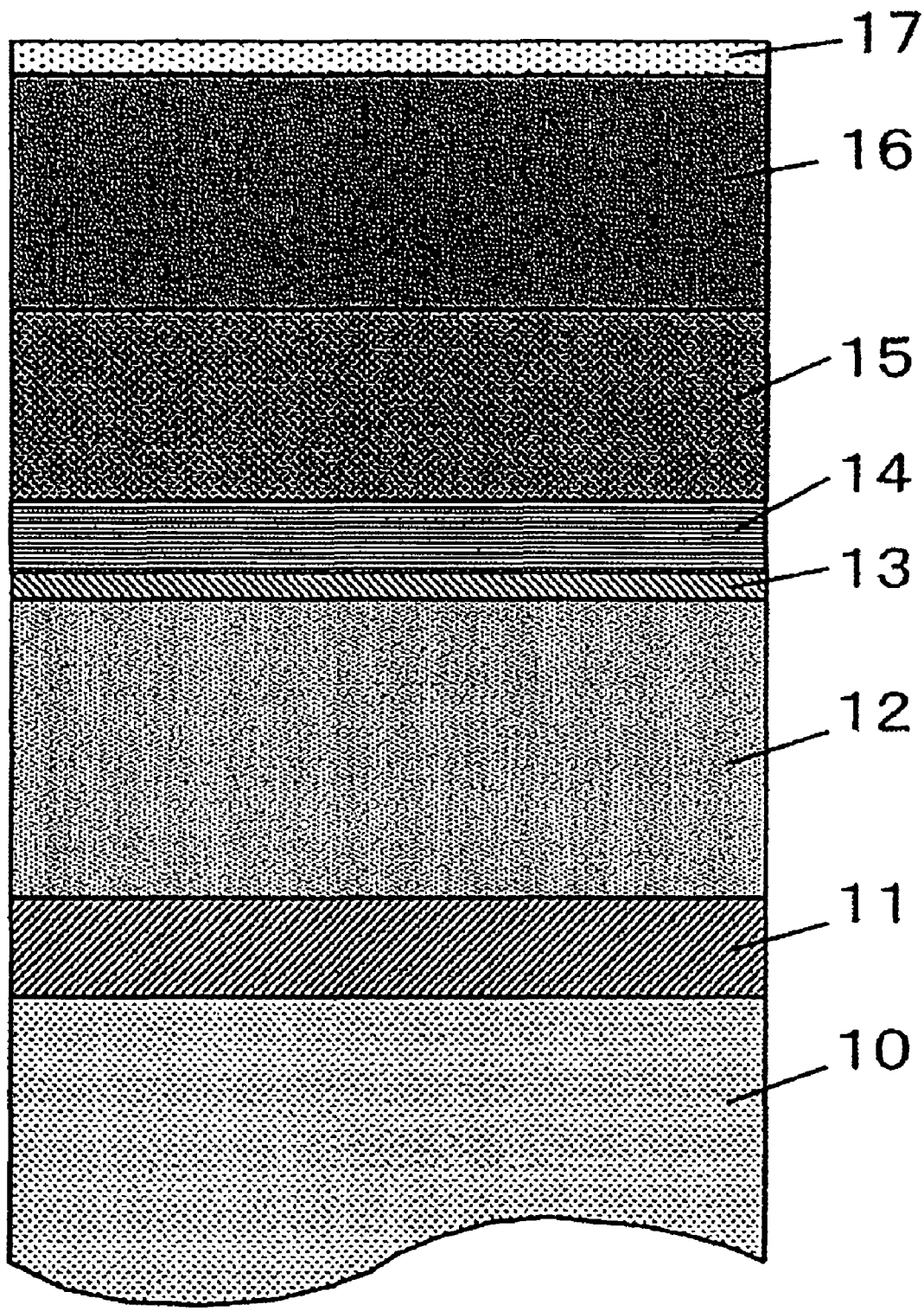
FIG. 1 is a schematic drawing illustrating a layer configuration of a perpendicular magnetic recording medium described in embodiment 1 of the present invention.

Embodiments of the present invention relate to a magnetic recording medium which is capable of recording a large volume of information and a magnetic storage apparatus using the magnetic recording medium.

An objective of embodiments of the present invention to ensure excellent reading/reproducing properties and to obtain excellent durability in a perpendicular magnetic recording medium where the recording layer has a granular structure. Moreover, it is an objective to provide a magnetic storage apparatus with high reliability where high density recording is possible, using such a perpendicular magnetic recording medium.

Embodiments of the present invention provide a perpendicular magnetic recording medium which includes an underlayer, an intermediate layer, a recording layer, and a protective layer laminated, in order, over a substrate, in which the recording layer includes a layer consisting of crystal grains mainly composed of cobalt and crystal grain boundaries mainly composed of the oxide, the oxygen content of the recording layer changing along the film thickness direction, the oxygen content in the area in the vicinity of the interface between the recording layer and the intermediate layer being lower than the oxygen content in the area in the vicinity of the center of the recording layer, and the oxygen content in the area in the vicinity of the interface between the recording layer and the protective layer is lower than the oxygen content of the area in the vicinity of the center of the recording layer. Or, it is characterized by having a distribution of the oxygen content along the film thickness direction so that the oxygen content increases from the interface with the intermediate layer to the protective layer side in the area in the vicinity of the interface between the recording layer and the intermediate layer, and that the oxygen content increases from the interface with the protective layer to the intermediate layer side in the area in the vicinity of the interface between the recording layer and the protective layer. Excellent recording/reproducing properties can be ensured and excellent durability can be obtained by manufacturing a perpendicular recording medium having such a distribution of the oxygen content.

However, if a hard material is used for the intermediate layer and the underlayer, it is possible to prevent it from large deformations when a heavy load is applied but it is impossible to prevent it from small deformations by a light load. When it is a perpendicular magnetic recording medium, about a 3 nm deep scratch was formed by applying a light load of about 100 $\mu N$ and a problem arises because this scratch becomes a reason for error. This shallow scratch is frequently produced arising from a granular type recording layer, so that it is necessary to improve the structure of the granular layer. As a result of investigating the relationship between the structure of the granular layer and the durability, it was effective to decrease the amount of oxygen or oxide included in the granular layer and to make the width of the crystal grain boundaries narrower throughout the entire body. However the recording/reproducing properties are widely deteriorated in this case, so that it does not act as a magnetic recording medium. Then, embodiments of the present invention provide an approach which not only decreases the oxygen content of the whole granular layer but also decreases the oxygen content only in the area in the vicinity of the interface between the protective layer and the intermediate layer. In this case, it was discovered that the deterioration of the recording/reproducing properties is suppressed to be small and the durability is greatly improved. It is important to strengthen the part where the stress is concentrated in order to improve the durability. Since the interior of the recording layer is composed of the same cobalt alloy, the cobalt alloy is grown as an identical grain keeping an epitaxial relationship even when the composition is changed by laminating a plurality of layers or when the oxide content is changed. Therefore, a point where the stress is concentrated, such as a necking of the grain, does not exist. On the other hand, the interfaces between the recording layer and the protective layer and between the recording layer and the intermediate layer are the parts contacting different materials, and, they do not grow continuously as an identical grain even if the epitaxial growth is partially maintained. As a result, stress concentration at the interface cannot be avoided. Based on this idea, there was an attempt to improve the interface between different materials.

As a result of decreasing the oxygen content in the regions of several nano-meters in thickness in the vicinity of the interfaces between the recording layer and the protective layer and between the recording layer and the intermediate layer, it was found that the formation of scratches by applying a light load can be suppressed. In addition, it was found that the formation of scratches cannot be suppressed even if only one junction interface is improved, and that it is necessary to improve both junction interfaces.

Moreover, it was found that the following three means are effective in order to maintain excellent durability while obtaining excellent recording/reproducing properties.

(1) The recording layer includes chromium, the chromium content in the recording layer changes along the film thickness direction, and the chromium content in the area in the vicinity of the interface between the recording layer and the intermediate layer is higher than the chromium content in the area in the vicinity of the center of the recording layer. It is an approach which decreases the saturation magnetization of a region in order to prevent the area from exerting a negative influence as a noise source when the oxygen content is decreased in the area in the vicinity of the interface between the recording layer and the intermediate layer.

(2) The intermediate layer includes a layer consisting of crystal grains mainly composed of at least ruthenium and crystal grain boundaries mainly composed of the oxide and a layer, which consists of crystal grains mainly composed of ruthenium and crystal grain boundaries mainly composed of the oxide, is formed adjacent to the recording layer. It is an approach for helping the formation of a segregation structure in the area in the vicinity of the interface between the recording layer and the intermediate layer.

(3) The recording layer includes platinum; the platinum content in the recording layer changes along the film thickness direction; the platinum content in the area in the vicinity of the interface between the recording layer and the intermediate layer is lower than the platinum content in the area in the vicinity of the center of the recording layer; and a non-magnetic layer is formed between the area in the vicinity of the interface with the intermediate layer and the area in the vicinity of the center of the recording layer. It is an approach which makes the area an assist layer for magnetic reversal composed of a material which contains a low platinum content and has small magnetic anisotropy by utilizing low oxygen content in the area in the vicinity of the interface with the intermediate layer. In this case, the interlayer magnetic coupling is made weaker by an appropriate amount by forming a thin non-magnetic layer between it and the upper main recording layer, resulting in the assist effect of the magnetic reversal becoming stronger.

Moreover, a magnetic storage apparatus with high reliability where high recording density is possible, can be obtained by combining a magnetic recording medium, a means for driving the perpendicular magnetic recording medium in the recording direction, a magnetic head including a recording unit and a read element, a means to drive the magnetic head relative to the perpendicular magnetic recording medium, and a signal processing unit to process input signals and output signals to and from the magnetic head.

According to embodiments of the present invention, with regard to a perpendicular magnetic recording medium, the durability can be improved while excellent recording/reproducing properties are ensured. Specifically, a noticeable effect for suppressing the creation of a scratch caused by a small load can be obtained. Moreover, the reliability of a magnetic storage apparatus can be improved by using a perpendicular magnetic recording medium of embodiments of the present invention.

Hereafter, the mode for carrying out embodiments of the invention will be explained referring to the drawings.

FIG. 1 is a schematic drawing illustrating a cross-section of a perpendicular magnetic recording medium of an embodiment 1. A perpendicular magnetic recording of this embodiment was manufactured by using a sputtering apparatus (C-3010) manufactured by ANELVA CORPORATION LRD. This sputtering apparatus includes ten process chambers, one loading chamber, and one unloading chamber, and each chamber is independently evacuated. All chambers were evacuated to a level of vacuum of $1 \times 10^{-5}$ Pa or less and the processes was performed, in order, by moving a carrier onto which a substrate was loaded into each process chamber. An adhesion layer 11, a soft-magnetic underlayer 12, a seed layer 13, a first intermediate layer 14, a second intermediate layer 15, a recording layer 16, and a protective layer 17 were laminated, in order, over a substrate 10.

A glass substrate with a thickness of 0.635 mm and a diameter of 65 mm was used for the substrate 10. Although a glass substrate with a smooth surface where texture processing is not applied is used in this embodiment, there is no problem if a textured substrate is used. Moreover, there is no effect on the efficacy of embodiments of the invention if a substrate having a different thickness and a different diameter is used. A 10 nm thick Al-50 at % Ti alloy film was formed as the adhesion layer 11. The adhesion layer is not limited to be an AlTi alloy and other materials may be used. An amorphous alloy, for instance, NiTa, NiTaZr, CrTi, and AlTa can be used. A film having a structure where two 15 nm thick Co-8 st % Ta-5 at % Zr alloy films were laminated through a 0.5 nm thick Ru film was formed as the soft-magnetic underlayer 12. It is preferable that an amorphous alloy or a microcrystalline alloy such as CoNbZr and FeTaZr be used, where one or more elements selected from Fe, Co, and Ni are included as a main component and at least one or more elements selected from Ta, Hf, Nb, Zr, Si, and B are added thereto. A 2 nm thick Ni-37.5 at % Ta alloy film is formed as a seed layer 13. The seed layer is not limited to a NiTa alloy if it is an amorphous alloy and, for instance, AlTi, NiTaZr, CrTi, and AlTa can be used. A 7 nm thick Ni-6 at % W alloy film was formed as a first intermediate layer 14. Although it is acceptable if there is no first intermediate layer, an alloy having a face centered cubic lattice structure is preferably used in order to obtain excellent recording/reproducing properties. For instance, NiCr, NiCrW, NiV, and PtCr can be used. The film formation process up to this point was carried out by sputtering in a gas pressure of 1 Pa using argon as a sputtering gas. Next, a 14 nm Ru film was formed as a second intermediate layer 15. With regard to the Ru film, a 7 nm thick film was formed in a gas pressure of 1 Pa and a 7 nm thick film was laminated in a gas pressure of 4 Pa. Argon gas is used for a sputtering gas.

The recording layer 16 is formed using a Co-22 at % Cr-19 at % Pt alloy target. Using two kinds of gasses which were argon gas and mixed gas of argon and 10% oxygen for the sputtering gas, the total gas pressure was controlled to be 5 Pa. Hereinafter, the flow ratio to Saigon gas in the added argon-oxygen mixed gas was called argon-oxygen gas flow ratio, and the oxygen content in the recording layer was changed by changing it during the process. Within a sputtering time of 6.3 seconds, the argon-oxygen gas flow ratio was controlled to be 5.0% for the initial 0.7 seconds, 11.7% for the next 4.0 seconds, and 0% for the final 1.6 seconds. The thickness of the recording layer was controlled to be 19 nm in total. The protective layer 17 was formed by a sputtering technique using a carbon target in a mixed gas where nitrogen at 0.05 Pa was added in argon with a gas pressure of 0.6 Pa. The thickness of the protective layer was controlled to be 4 nm. Moreover, a 1 nm thick lubricant film was coated over the surface of the protective layer. When the microstructure of the recording layer of the fabricated sample was observed by using a high resolution transmission electron microscope, a structure was confirmed in which the crystal grain boundaries formed of the oxide could be distinguished as a bright color apart from the crystal grains having a dark color which were formed of a metallic element, and in which individual crystal grains were surrounded by oxide grain boundaries.

Figure 2:
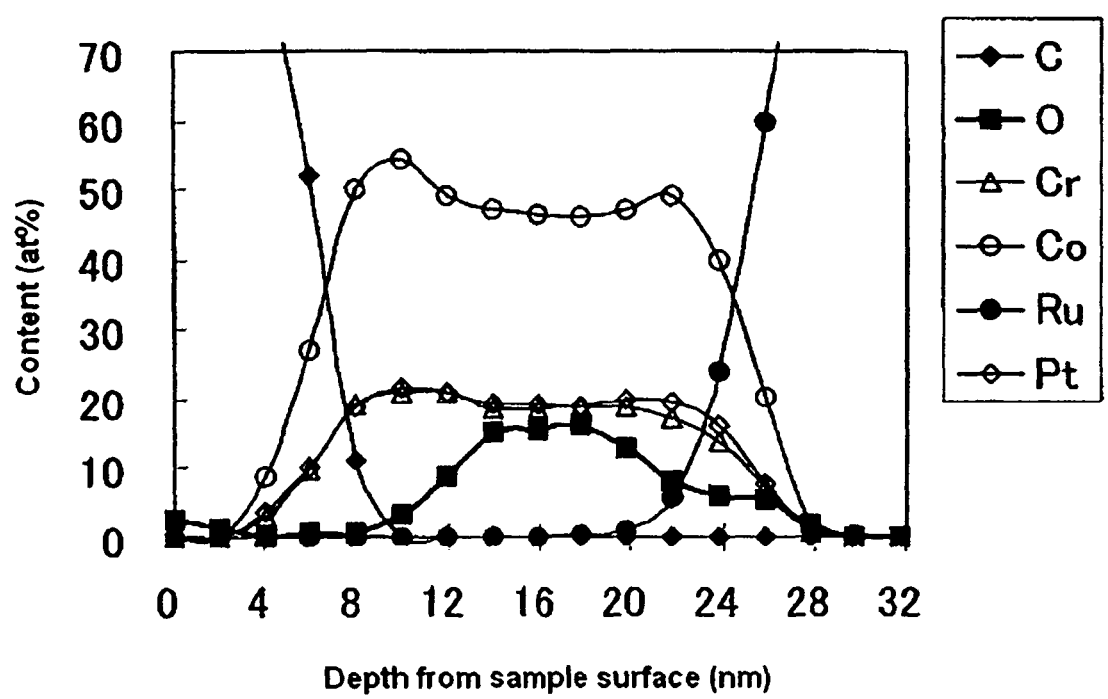
FIG. 2 shows a composition distribution diagram of sample 1A described in embodiment 1 of the present invention.

The composition of the recording layer of the perpendicular magnetic recording medium was obtained by using X-ray photoelectron spectroscopy. An area with a length of 1.5 mm and a width of 0.1 mm was analyzed by digging in the depth direction by sputtering from the sample surface using an ion gun with an acceleration voltage of 500 V and by using the Kα line of aluminum as an x-ray source. The content of each element was obtained in at % by detecting the spectrum near the energy corresponding to each of the 1s electrons of C, the 1s electrons of O, the 2s electrons of Si, the 2p electrons of Cr, the 2p electrons of Co, the 3d electrons of Ru, and the 4f electrons of Pt. FIG. 2 shows the analysis results of a sample of this embodiment. FIG. 2 is a figure in which the contents of C, O, Cr, Co, Ru, and Pt were measured in a depth interval within a region about 2 nm from the film surface to a depth of 32 nm and plotted. The area from a depth of 6 nm where the C in the protective layer becomes 50 at % or less to a depth of 25 nm where Ru in the intermediate layer becomes 50 at % or more was judged as the recording layer, and the concentration change of each element contained in the recording layer was obtained.

Figure 3:
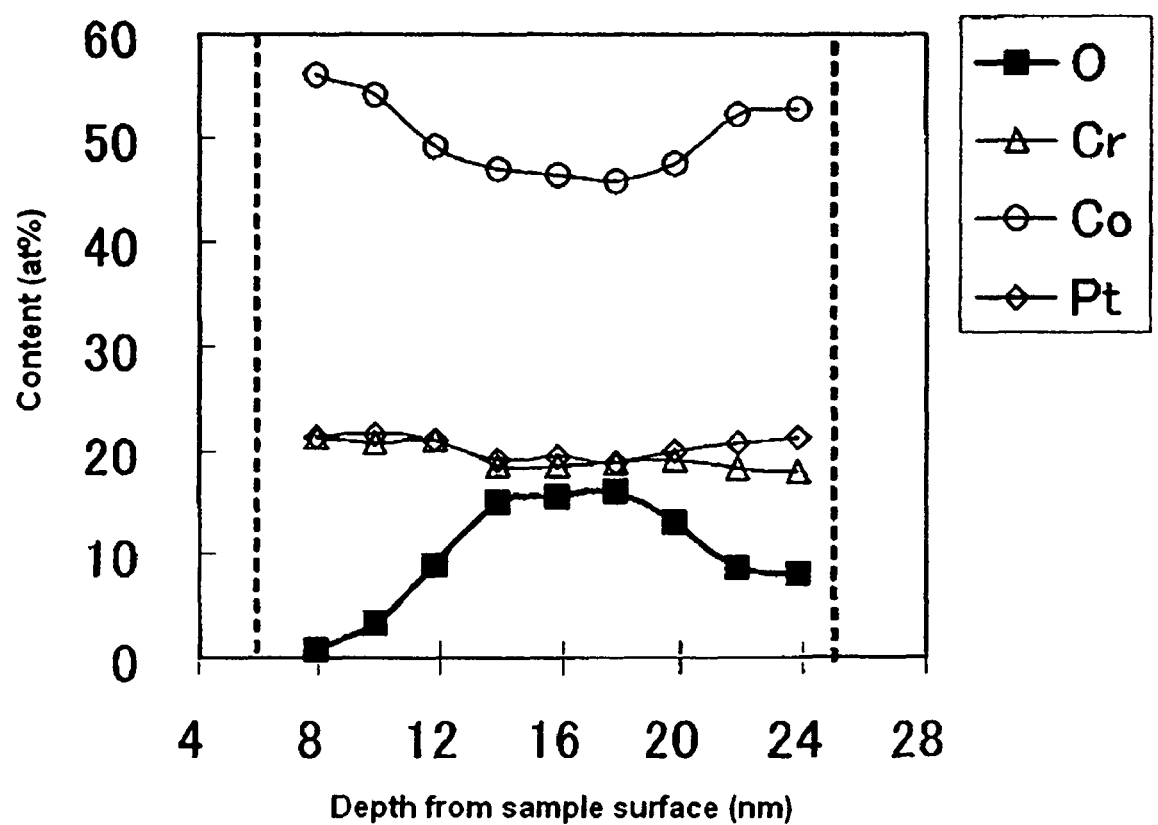
FIG. 3 shows a composition distribution diagram of sample 1A described in embodiment 1 of the present invention.

FIG. 3 shows the calculation results of these ratios of contents focusing attention on only O, Cr, Co, and Pt which are the main elements of the recording layer. The oxygen content changes depending on the flow rate of the argon-oxygen gas. The oxygen content of the recording layer increases from the right end of the graph to the center, that is, from the interface with the intermediate layer to the protective layer side in an area in the vicinity of the interface between the recording layer and the intermediate layer. Moreover, the oxygen content of the recording layer increases from the left end of the graph to the center, that is, from the interface with the protective layer to the intermediate layer side in an area in the vicinity of the interface between the recording layer and the protective layer. The mode of the distributions around 8 to 10 nm and around 22 to 24 nm look different in FIGS. 2 and 3. This is due to fact that in FIG. 3 the ratios of the contents were calculated again except for C and Ru. The distributions in the two figures look different due to the effect of C around 8 to 10 nm and the effect of Ru around 22 to 24 nm.

Moreover, using the results of FIG. 3, the mean value of each oxygen content is obtained from an area of 4 nm in the vicinity of the interface between the recording layer and the intermediate layer, an area of 4 nm in the vicinity of the center of the recording layer, and an area of 4 nm in the vicinity of the interface with the protective layer, and the results are shown in Table 1 (sample 1A). As a result, it can be confirmed that the oxygen content in the area in the vicinity of the interface between the recording layer and the intermediate layer is lower than the oxygen content in the area in the vicinity of the center of the recording layer, and that the oxygen content in the area in the vicinity of the interface between the recording layer and the protective layer is lower than the oxygen content in the area in the vicinity of the center of the recording layer.

TABLE 1

| | Oxygen content (at %) | | | | |
| --- | --- | --- | --- | --- | --- |
| Sample number | Near interface with intermediate layer | Center of recording layer | Near interface with protective layer | Scratch depth (nm) | SNR (dB) |
| 1A | 8.3 | 15.8 | 2.1 | 1.44 | 20.1 |

The results of the scratch test and the SNR evaluation which were performed on sample 1A are shown in Table 1. The scratch test is done by scratching the medium surface by applying a load of 100 μN to a scratch needle and measuring the depth of the created scratch mark using an atomic force microscope. The measurement of the depth is done by sweeping a probe along the line crossing the scratch and measuring the shape of the cross-section. Five scratches were formed for each sample and the average of these depths was obtained. The depth of the scratch measured for the sample 1A of this embodiment was 1.44 nm and the scratch can be suppressed to a smaller level than in the prior art. Moreover, the SNR was evaluated by means of a spinstand. A magnetic head was used, which has a single pole type recording element with a track width of 95 nm and a read element using a giant magnetoresistive effect with a track width of 70 mm. The recording element includes a main pole and an auxiliary pole and has a structure where a shield is provided in the track width direction side and the trailing, direction side to surround the main pole. The reproducing output and the noise were measured under the conditions of a peripheral speed of 10 m/sec, a skew angle of 0 degrees, and a magnetic spacing of about 15 nm, and the medium SNR was defined to be the ratio of the reproducing output when a signal of 1970 fr/mm was recorded and the integration noise when a signal of 41730 fr/mm was recorded.

Figure 4A:
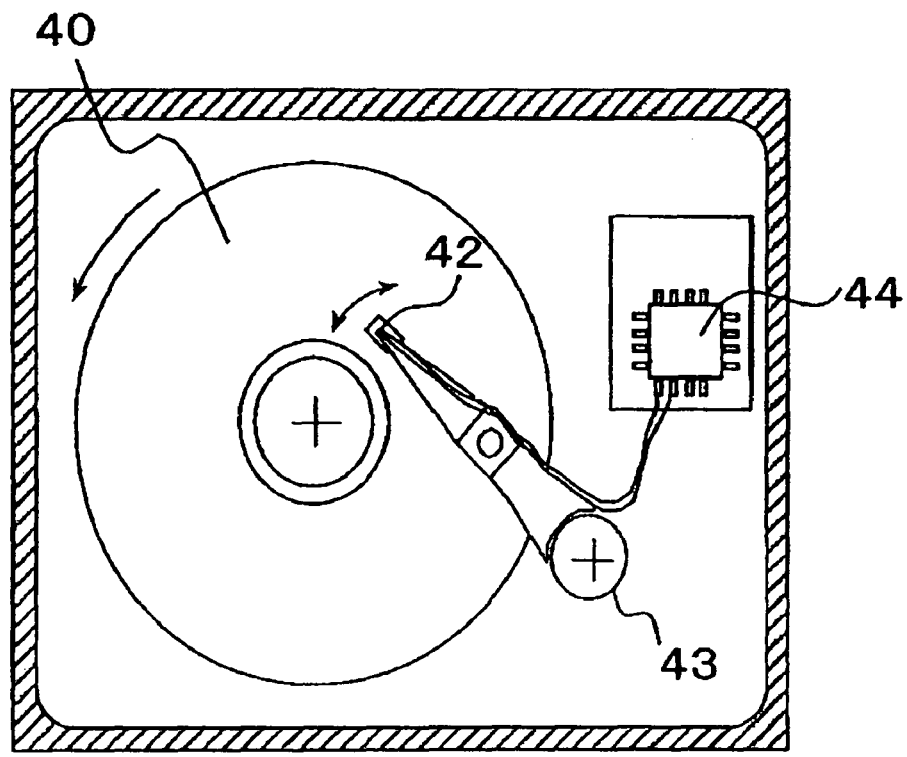
FIGS. 4(a) and 4(b) are schematic drawings of a magnetic storage apparatus, in which 4(a) is a plane drawing and 4(b) is a cross-sectional drawing.
Figure 4B:
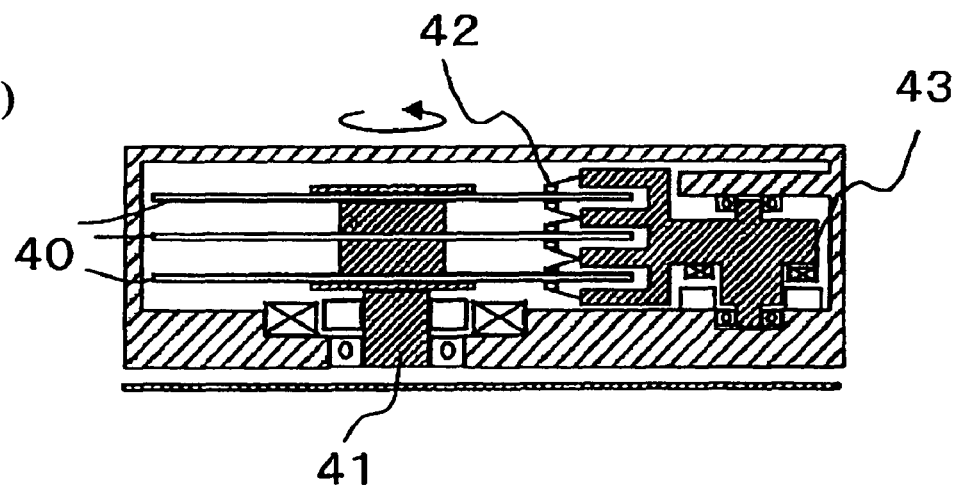

FIG. 4 is a drawing illustrating one example of a magnetic storage apparatus. The magnetic storage apparatus includes a magnetic recording medium 40, an actuator 41 for rotating the magnetic recording medium, a magnetic head 42, an actuator for the magnetic head 43, and a means for performing input/output of signals to/from the magnetic head 44. The magnetic head 42 includes a recording element and a read element, in which the read element uses a magnetoresistive effect and the recording element includes a main pole and an auxiliary pole. A shield was provided in the track width direction side and the trailing direction side to surround the main pole of the recording element. Operation of 31.0 gigabits per square centimeter could be confirmed by installing a perpendicular magnetic recording medium of this embodiment in this apparatus and controlling the head flying height to be 9 nm, the linear recording density per centimeter to be 393,700 bits, and the track density per centimeter to be 78,740 tracks. Moreover, after repeating a load, unload, and seek of the head 1.5 million times, the bit error count was 10 or less per single face. According to embodiments of the present invention, a magnetic storage apparatus with high reliability where high density recording is possible, can be obtained.

In this embodiment, a process is applied to at least one selected from the substrate, the underlayer, the intermediate layer, and the recording layer, and it can be applied to a so-called discrete track medium or a patterned medium where the recording layer is periodically delimited in-plane of the disk face to be a discontinuous structure, so that the durability can be improved while excellent recording/reproducing properties are ensured. Since these media rather have a discontinuous structure by delimiting the recording layer in-plane of the disk, improvement of the durability is highly required and the role that embodiments of the invention play to improve the durability is great. The discrete track medium has a structure where the recording layer does not exist between adjacent data tracks or a structure where the recording layer is formed over the convex part at the data track and formed in the concave part at the gap between adjacent data tracks. The pattern medium has a structure where the recording layer does not exist at the gap between adjacent data bits or a structure where the recording layer is formed over the convex part at the data bit and formed in the concave part at the gap between adjacent data bits.

A perpendicular magnetic recording medium of this comparative example was manufactured by using the entirely same materials under the same process conditions as the embodiment 1 with regard to the configuration elements except for the recording layer. The same as the embodiment 1, the recording layer was formed by using a Co-22 at % Cr-19 at % Pt alloy target. Using two kinds of gasses which were argon gas and mixed gas of argon and 10% oxygen for the sputtering gas, the total gas pressure was controlled to be 5 Pa. The oxygen content of the recording layer is changed by changing the argon-oxygen gas flow ratio in the middle of the process. The change of the oxygen content is set in a different condition from the embodiment 1. For preparing the sample 1A, the argon-oxygen gas flow ratio was controlled to be 30% for 0.2 seconds right before sputtering, 11.7% for the initial 4.7 seconds, and 0% for the final 1.6 seconds. The thickness of the recording layer was 10 nm in total. For preparing the sample 1Q, the argon-oxygen gas flow ratio was controlled to be 5.0% for the initial 0.7 seconds, 11.7% for the next 4.0 seconds, and 0% for the final 1.6 seconds. The thickness of the recording layer was 14 nm in total. For preparing the sample 1R, the argon-oxygen gas flow ratio was controlled to be 30% for 0.2 seconds right before sputtering and 8.3% for 4.7 seconds during sputtering. The thickness of the recording layer was 14 nm in total. The reason why the argon-oxygen gas flow ratio was controlled to be as high as 30% for 0.2 seconds right before sputtering in the samples 1P and 1R was to promote the formation of an oxide segregation structure in the initial growth part of the recording layer, and it is effective to improve the recording/reproducing properties.

Figure 5:
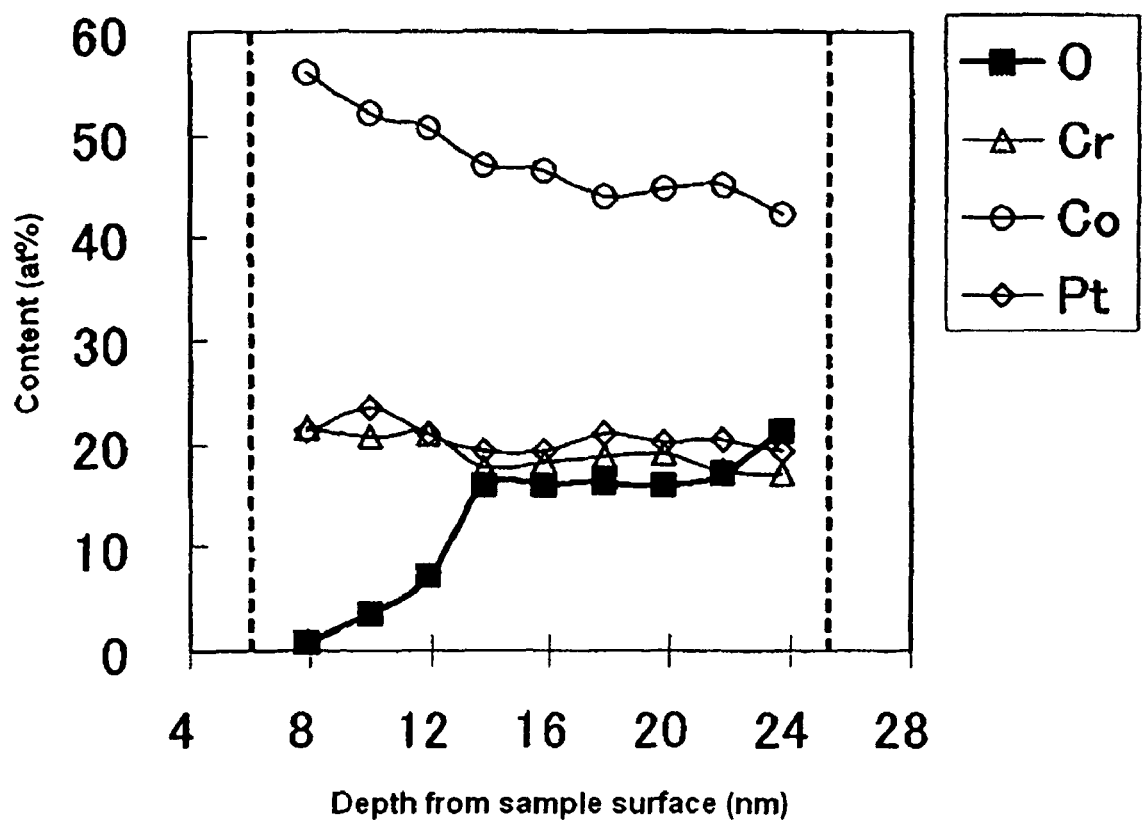
FIG. 5 shows a composition distribution diagram of a recording layer of sample 1P described in embodiment 1 of the present invention.
Figure 6:
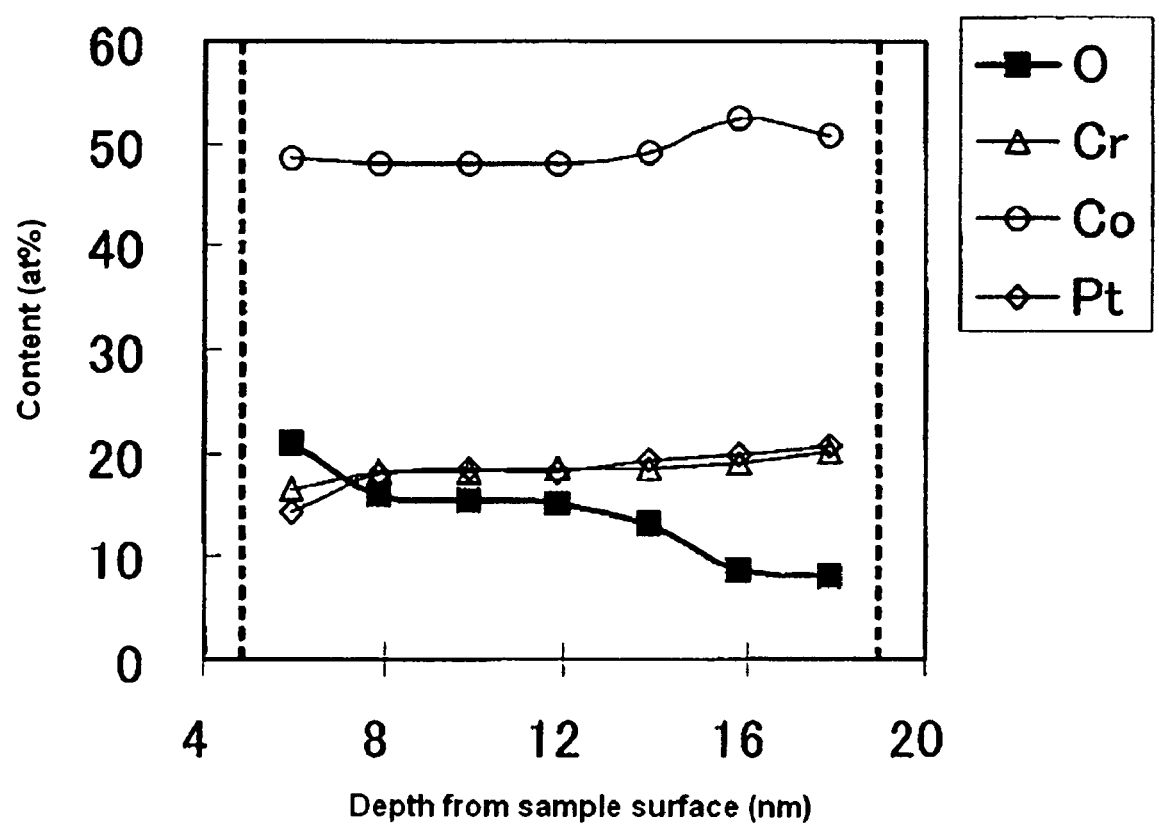
FIG. 6 shows a composition distribution diagram of a recording layer of sample 1Q described in embodiment 1 of the present invention.
Figure 7:
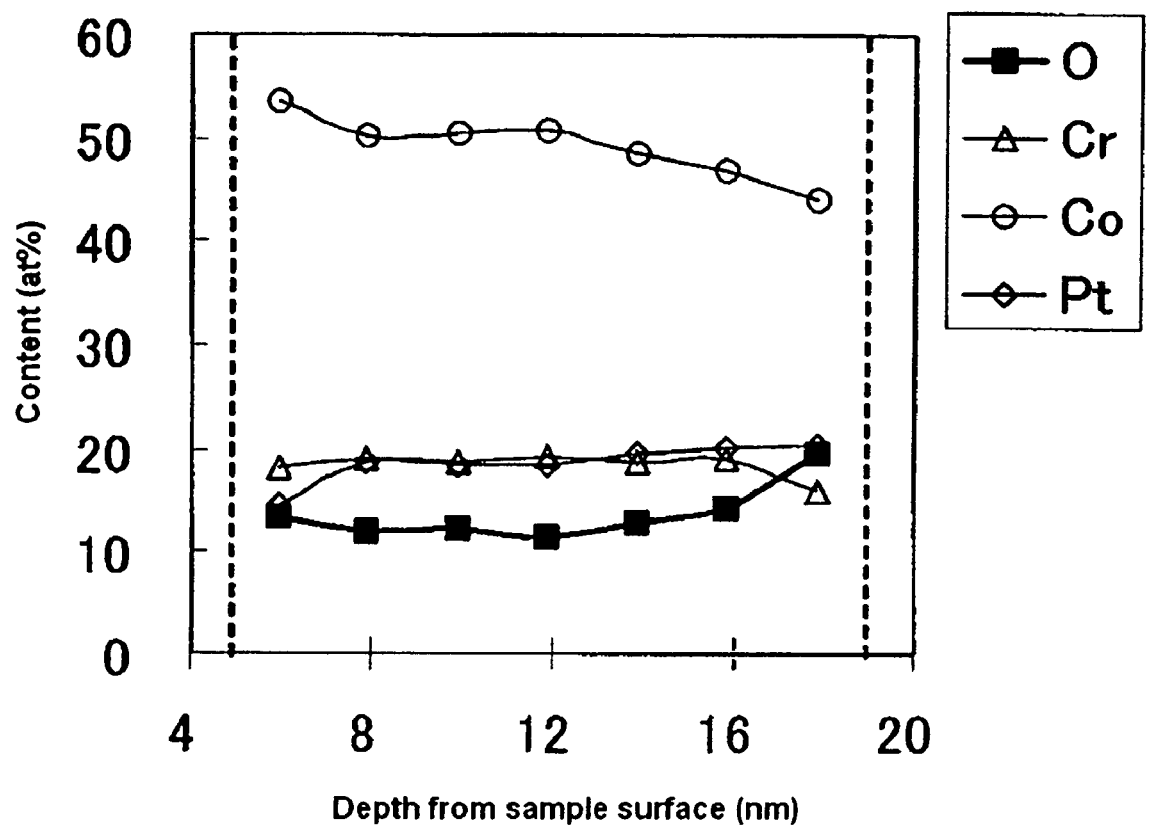
FIG. 7 shows a composition distribution diagram of a recording layer of sample 1R described in embodiment 1 of the present invention.

The compositions of the recording layers of these samples were obtained by using X-ray photoelectron spectroscopy similar to the embodiment 1. In common with the embodiment 1, the area from the depth where the C in the protective layer becomes 50 at % or less to the depth where Ru in the intermediate layer becomes 50 at % or more was judged as the recording layer, and the concentration change of each element contained in the recording layer was obtained. FIGS. 5, 6, and 7 show the calculation results of these ratios of contents focusing attention on only O, Cr, Co, and Pt which are the main elements of the recording layer. With regard to the sample 1P and the sample 1R, the oxygen content decreases from the right end of the graph to the center, that is, from the interface with the intermediate layer to the protective layer side in an area in the vicinity of the interface with the intermediate layer, resulting in the distribution of the oxygen content being different from the embodiment 1. Moreover, with regard to the sample 1Q and the sample 1R, the oxygen content decreases from the left end of the graph to the center, that is, from the interface with the protective layer to the intermediate layer side in the area in the vicinity of the interface with the protective layer, resulting in the distribution of the oxygen content being different from embodiment 1.

Moreover, using the results of FIGS. 5, 6, and 7, the mean value of each oxygen content is obtained from an area of 4 nm in the vicinity of the interface between the recording layer and the intermediate layer, an area of 4 nm in the vicinity of the center of the recording layer, and an area of 4 nm in the vicinity of the interface between the recording layer and the protective layer, and the results are shown in Table 2. The results of the scratch test which was performed on these samples are also shown in Table 2. The scratch test was carried out with the same technique as the embodiment 1. The scratch depths measured for the sample 1P, the sample 1Q, and the sample 1R are 2.86 nm, 2.98 nm, and 3.21 nm, respectively, and deeper scratches were clearly observed when compared with the embodiment 1 (Table 1). As a result, it could be confirmed that it is effective for the improvement of the durability of a granular type perpendicular magnetic recording medium that the oxygen content in the area in the vicinity of the interface between the recording layer and the intermediate layer is made lower than the oxygen content in the area in the vicinity of the center of the recording layer and the oxygen content in the area in the vicinity of the interface between the recording layer and the protective layer is made lower than the oxygen content in the vicinity of the center of the recording layer.

TABLE 2

| Sample number | Oxygen content (at %) | | | Scratch depth (nm) | SNR (dB) |
| --- | --- | --- | --- | --- | --- |
| | Near interface with intermediate layer | Center of recording layer | Near interface with protective layer | | |
| 1A | 19.1 | 16.0 | 2.3 | 2.86 | 20.2 |
| 1Q | 8.4 | 14.2 | 18.5 | 2.98 | 12.1 |
| 1R | 17.0 | 12.2 | 12.8 | 3.21 | 10.5 |

When a perpendicular magnetic recording medium of this comparative example is installed in the same magnetic storage apparatus as the embodiment 1 and operated, although an operation with 31.0 gigabits per square centimeter could be confirmed in the sample 1P, operation with 31.0 gigabits per square centimeter was impossible due to frequent bit errors occurring right from the beginning in the sample 1Q and the sample 1R. When the test where load, unload, and seek of the head are repeated 1.5 million times was performed for the sample 1P, bit errors occurred frequently and in the end it became inoperative. When it was disassembled to observe the medium surface, many scratches were observed.

In this embodiment, an approach will be explained to obtain better recording/reproducing properties while excellent durability is maintained in a perpendicular magnetic recording medium having the features described in the embodiment 1. The feature is that the recording layer contains chromium; the chromium content changes along the film thickness direction; and the chromium content in the area in the vicinity of the interface between the recording layer and the intermediate layer is higher than the chromium content in the area in the vicinity of the center of the recording layer. This is an approach to decrease the saturation magnetization in an area in the vicinity of the interface between the recording layer and the intermediate layer in order to decrease the deleterious effects, paying attention that the region has adverse effects as a noise source when the oxygen content is reduced in the area in the vicinity of the interface between the recording layer and the intermediate layer.

Figure 8:
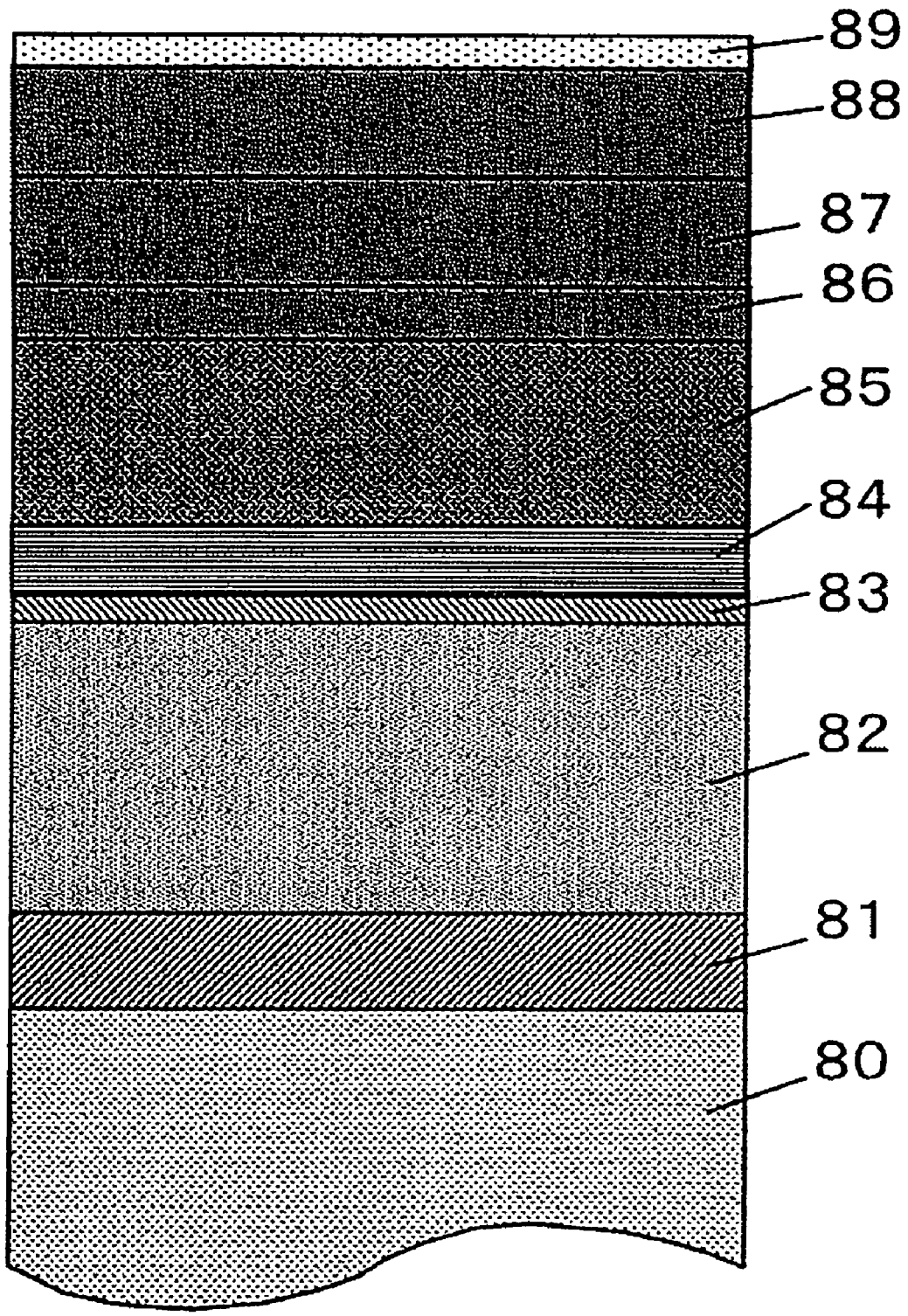
FIG. 8 is a schematic drawing of a layer configuration of a perpendicular magnetic recording medium described in embodiment 2 of the present invention.

FIG. 8 is a schematic drawing illustrating a cross-section of a perpendicular magnetic recording medium of this embodiment. A perpendicular magnetic recording medium of this embodiment is manufactured by using a sputtering apparatus which is the same as that in the embodiment 1 under similar conditions. An adhesion layer 81, a soft-magnetic underlayer 82, a seed layer 83, a first intermediate layer 84, a second intermediate layer 85, a first recording layer 86, a second recording layer 87, a third recording layer 88, and a protective layer 89 were laminated, in order, over a substrate 80.

A glass substrate with a thickness of 0.635 mm and a diameter of 65 mm was used for the substrate 80; a 10 nm thick Al-50 at % Ti alloy film was formed as an adhesion layer 81; and a film having a structure where two 20 nm thick Fe-34 at % Co-10 at % Ta-5 at % Zr alloy films were laminated through a 0.5 nm thick Ru film was formed as the soft-magnetic underlayer 82. A 2 nm thick Ni-37.5 at % Ta alloy film was formed as the seed layer 83 and a 7 nm thick Ni-6 at % W alloy film was formed as the first intermediate layer 84. The film formation process up to this point was carried out by sputtering in a gas pressure of 1 Pa using argon as a sputtering gas. Next, a 12 nm thick Ru film was formed as the second intermediate layer 85. With regard to the Ru film, a 6 nm thick film was formed in a gas pressure of 1 Pa and a 6 nm thick film was laminated in a gas pressure of 4 Pa. Argon gas was used for a sputtering gas. The recording layer is assumed to be a laminated structure of three layers, in which the first recording layer 86 and the second recording layer 87 were formed in a gas pressure of 5 Pa using two kinds of gasses, argon gas and a mixed gas where 10% oxygen was mixed with argon, and the third recording layer 88 was formed under a condition of gas pressure of 1 Pa only using argon. The oxygen content in the recording layer was changed by changing the argon-oxygen gas flow ratio during the process. The protective layer 89 was formed by a sputtering technique using a carbon target in a mixed gas where nitrogen of 0.05 Pa was added to argon with a gas pressure of 0.6 Pa. The thickness of the protection layer was controlled to be 4 nm. Moreover, a 1 nm thick lubricant film was coated over the surface of the protective layer.

In the sample 2A, a 5 nm thick film was formed as the first recording layer by using a target where 8 mol % of SiO2 was added to a Co-33 at % Cr-8 at % Pt alloy under the condition of an argon-oxygen gas flow ratio of 0%; a 12 nm thick film was formed as the second recording layer by using a target where 8 mol % of SiO2 was added to a Co-19 at % Cr-18 at % Pt alloy under the condition of an argon-oxygen gas flow ratio of 11.7%; and an 8 nm thick film was formed as the third recording layer by using a target of Co-26 at % Cr-10 at % Pt alloy.

In the sample 2B, the recording layer was formed by using the same materials and the same conditions as the sample 2A except for the argon-oxygen gas flow ratio being 5% while forming the first recording layer. In the sample 2C, the recording layer was formed by using the same materials and same conditions as the sample 2B except for using a target where 6 mol % of SiO2 was added to a Co-33 at % Cr-8 at % Pt alloy while forming the first recording layer. In the sample 2D, the recording layer was formed by using the same materials and the same conditions as the sample 2A except for using a target where 7 mol % of SiO2 was added to a Co-38 at % Cr-4 at % Pt alloy while forming the first recording layer and making the thickness of the first recording layer be 3 nm. In the sample 2E, the recording layer was formed by using the same materials and the same conditions as the sample 2A except for using a target where 6 mol % of SiO2 was added to a Co-43 at % Cr alloy while forming the first recording layer and making the thickness of the first recording layer be 1.5 nm.

In the sample 2F, a 2 nm thick film was formed as the first recording layer by using a target where 7 mol % of SiO2 was added to a Co-38 at % Cr-4 at % Pt alloy under the condition of an argon-oxygen gas flow ratio of 0%; an 11 nm thick film was formed as the second recording layer by using a target where 7 mol % of SiO2 was added to a Co-17 at % Cr-16 at % Pt alloy under the condition of an argon-oxygen gas flow ratio of 13.3%; and an 8 nm thick film was formed as the third recording layer by using a target of a Co-28 at % Cr-8 at % Pt-2 at % B alloy. In the sample 2G, the first recording layer was formed by using the same materials and the same conditions as the sample 2F; a 10 nm thick film was formed as the second recording layer by using a target where 8 mol % of $SiO_2$ was added to a Co-15 at % Cr-18 at % Pt alloy under the condition of an argon-oxygen gas flow ratio of 10.0%; and a 4 nm thick film was formed as the third recording layer by using a target of a Co-14 at % Cr-6 at % Pt-4 at % B alloy.

In the sample 2H, a 2 nm thick film was formed as the first recording layer by using a target where 6 mol % of TiO2 was added to a Co-38 at % Cr-4 at % Pt alloy under the condition of an argon-oxygen gas flow ratio of 0%; a 13 nm thick film was formed as the second recording layer by using a target where 6 mol % of TiO2 was added to a Co-19 at % Cr-16 at % Pt alloy under the condition of an argon-oxygen gas flow ratio of 8.3%; and the third recording layer was formed by using the same materials and the same conditions as the sample 2G. In the sample 2I, a 2 nm thick film was formed as the first recording layer by using a target where 2.5 mol % of Ta2O5 was added to a Co-38 at % Cr-4 at % Pt alloy under the condition of an argon-oxygen gas flow ratio of 0%; a 13 nm thick film was formed as the second recording layer by using a target where 2.5 mol % of Ta2O5 was added to a Co-19 at % Cr-16 at % Pt alloy under the condition of an argon-oxygen gas flow ratio of 11.7%; and the third recording layer was formed by using the same materials and the same conditions as the sample 2G.

Figure 9:
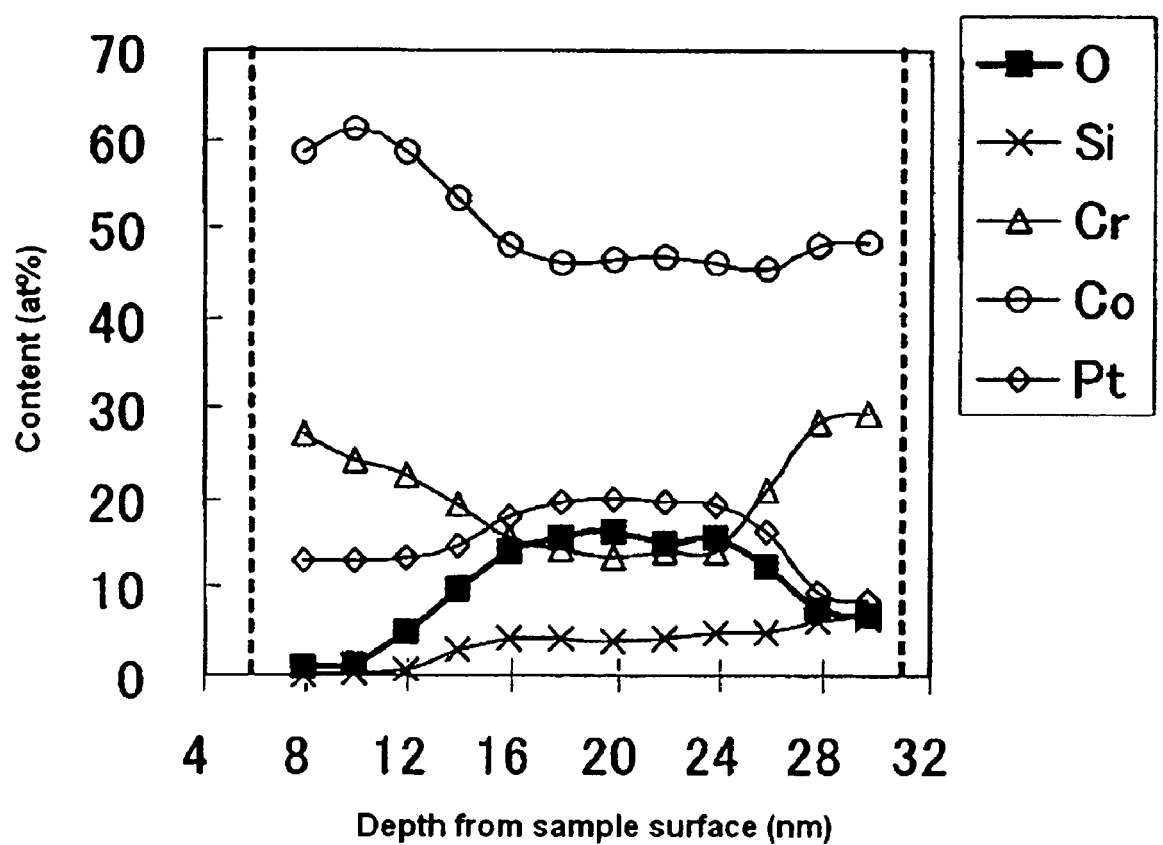
FIG. 9 shows a composition distribution diagram of a recording layer of sample 2A described in embodiment 2 of the present invention.

The composition of the recording layer of the sample 2A was obtained by using X-ray photoelectron spectroscopy similar to the embodiment 1. In common with the embodiment 1, the area from the depth where the C in the protective layer becomes 50 at % or less to the depth where Ru in the intermediate layer becomes 50 at % or more was judged as the recording layer, and the concentration change of each element contained in the recording layer was obtained. FIG. 9 shows the calculation results of these ratios of contents of these elements focusing attention on only O, Si, Cr, Co, and Pt which are the main elements of the recording layer. The oxygen content of the recording layer increases from the right end of the graph to the center, that is, from the interface with the intermediate layer to the protective layer side in the area in the vicinity of the interface with the intermediate layer, and the oxygen content of the recording layer increases from the left end of the graph to the center, that is, from the interface with the protective layer to the intermediate layer side in the area in the vicinity of the interface with the protective layer. Moreover, the chromium content of the recording layer decreases from the right end of the graph to the center, that is, from the interface with the intermediate layer to the protective layer side in the area in the vicinity of the interface with the intermediate layer.

According to the composition analyses of the samples in this embodiment, each oxygen content (mean value) is obtained from an area of 4 nm in the vicinity of the interface between the recording layer and the intermediate layer, an area of 4 nm in the vicinity of the center of the recording layer, and an area of 4 nm in the vicinity of the interface between the recording layer and the protective layer, and the results are shown in Table 3. The chromium content (mean value) in each area of depth of the recording layer is similarly obtained and shown in Table 4. In all samples in this embodiment, it is understood that the oxygen content in the area in the vicinity of the interface between the recording layer and the intermediate layer is lower than the oxygen content in the area in the vicinity of the center of the recording layer, and that the oxygen content in the area in the vicinity of the interface between the recording layer and the protective layer is lower than the oxygen content in the area in the vicinity of the center of the recording layer. Moreover, in all samples in this embodiment, the chromium content in the area in the vicinity of the interface between the recording layer and the intermediate layer is higher than the chromium content in the area in the vicinity of the center of the recording layer. The results of the scratch test and the SNR evaluation which was performed on these samples are shown in Table 3. The scratch test and the SNR evaluation were carried out by using the same techniques as in the embodiment 1.

In samples of this embodiment, all scratch depths can be controlled to be smaller than 1.5 nm and they possess excellent durability. Moreover, all SNRs are greater than 22 dB and have excellent recording/reproducing properties. Specifically, in a perpendicular magnetic recording medium in which the oxygen content in the area in the vicinity of the interface between the recording layer and the intermediate layer is lower than the oxygen content in the area in the vicinity of the center of the recording layer, and the oxygen content in the area in the vicinity of the interface between the recording layer and the protective layer is lower than the oxygen content in the area in the vicinity of the center of the recording layer, excellent recording/reproducing properties can be obtained while maintaining excellent durability by making the chromium content in the area in the vicinity of the interface between the recording layer and the intermediate layer higher than the chromium content in the area in the vicinity of center of the recording layer.

TABLE 3

| Sample number | Oxygen content (at %) | | | Scratch depth (nm) | SNR (dB) |
|---|---|---|---|---|---|
| | Near interface with intermediate layer | Center of recording layer | Near interface with protective layer | | |
| 2A | 7.3 | 15.7 | 1.1 | 1.30 | 22.5 |
| 2B | 9.7 | 16.1 | 1.3 | 1.43 | 22.3 |
| 2C | 9.2 | 16.2 | 1.3 | 1.39 | 22.3 |
| 2D | 6.5 | 15.3 | 1.2 | 1.32 | 22.6 |
| 2E | 5.9 | 15.6 | 1.4 | 1.37 | 22.7 |
| 2F | 6.7 | 16.8 | 1.7 | 1.45 | 22.4 |
| 2G | 6.8 | 13.9 | 1.9 | 1.23 | 22.3 |
| 2H | 5.8 | 12.2 | 2.3 | 1.10 | 22.5 |
| 2I | 6.1 | 13.7 | 2.4 | 1.27 | 22.7 |

TABLE 4

| Sample number | Chromium content (at %) | | |
|---|---|---|---|
| | Near interface with intermediate layer | Center of recording layer | Near interface with protective layer |
| 2A | 29.0 | 13.8 | 25.7 |
| 2B | 28.6 | 14.2 | 25.9 |
| 2C | 30.1 | 14.1 | 25.7 |
| 2D | 33.5 | 14.3 | 25.5 |
| 2E | 38.7 | 14.4 | 25.8 |
| 2F | 33.3 | 13.5 | 27.8 |
| 2G | 33.2 | 11.2 | 14.7 |
| 2H | 34.1 | 15.0 | 14.6 |
| 2I | 33.0 | 14.9 | 14.4 |

Operation of 37.2 gigabits per square centimeter could be confirmed by installing a perpendicular magnetic recording medium of this embodiment in a magnetic storage apparatus and controlling the head flying height to be 8 nm, the linear recording density per centimeter to be 472,400 bits, and the track density per centimeter to be 78,740 tracks. Moreover, after repeating the load, unload, and seek of the head 1.5 million times, the bit error count was 10 or less per single face. According to embodiments of the present invention, a magnetic storage apparatus with high reliability where high density recording is possible, can be obtained.

In this embodiment, a process is applied to at least one selected from the substrate, the underlayer, the intermediate layer, and the recording layer, and it can be applied to a so-called discrete track medium or a patterned medium where the recording layer is periodically delimited in-plane of the disk face to be a discontinuous structure, so that the durability can be improved while excellent recording/reproducing properties are ensured. Since these media rather have a discontinuous structure by delimiting the recording layer in-plane of the disk, improvement of the durability is highly required and the role that embodiments of the present invention play to improve the durability is great.

A perpendicular magnetic recording medium of this comparative example was manufactured by using the entirely same materials under the same process conditions as the embodiment 2 with regard to the configuration elements except for the recording layer. In the sample 2P, the recording layer was formed by using the same materials and the same conditions as the sample 2A except for the argon-oxygen gas flow ratio being 11.7% while forming the first recording layer. In the sample 2Q, the first recording layer was not formed and the second recording layer and the third recording layer were formed by using the same materials and the same conditions as the sample 2A.

In the sample 2R, a 3 nm thick film was formed as the first recording layer by using a target where 7 mol % of $SiO_2$ was added to a Co-38 at % Cr-4 at % Pt alloy under the condition of an argon-oxygen gas flow ratio of 0%; the second recording layer was formed by using the same materials and the same conditions as the sample 2A; and the third recording layer was not formed. In the sample 2S, the first recording layer was not formed; a 14 nm thick film was formed as the second recording layer by using a target where 7 mol % of $SiO_2$ was added to a Co-21 at % Cr-20 at % Pt alloy under the condition of an argon-oxygen gas flow ratio of 13.3%; and the third recording layer was not formed.

In the sample 2T, a 2 nm thick film was formed as the first recording layer by using a target where 2.5 mol % of $Ta_2O_5$ was added to a Co-38 at % Cr-4 at % Pt alloy under the condition of an argon-oxygen gas flow ratio of 11.7%; a 13 nm thick film was formed as the second recording layer by using a target where 2.5 mol % of $Ta_2O_5$ was added to a Co-19 at % Cr-16 at % Pt alloy under the condition of an argon-oxygen gas flow ratio of 11.7%; and the third recording layer was formed by using the same materials and the same conditions as the sample 2I. In the sample 2U, a 2 nm thick film was formed as the first recording layer by using a target where 2 mol % of Ta2O5 was added to a Co-38 at % Cr-4 at % Pt alloy under the condition of an argon-oxygen gas flow ratio of 0%; a 10 nm thick film was formed as the second recording layer by using a target where 2.5 mol % of Ta2O5 was added to a Co-15 at % Cr-18 at % Pt alloy under the condition of an argon-oxygen gas flow ratio of 13.3%; and the third recording layer was not formed.

Figure 10:
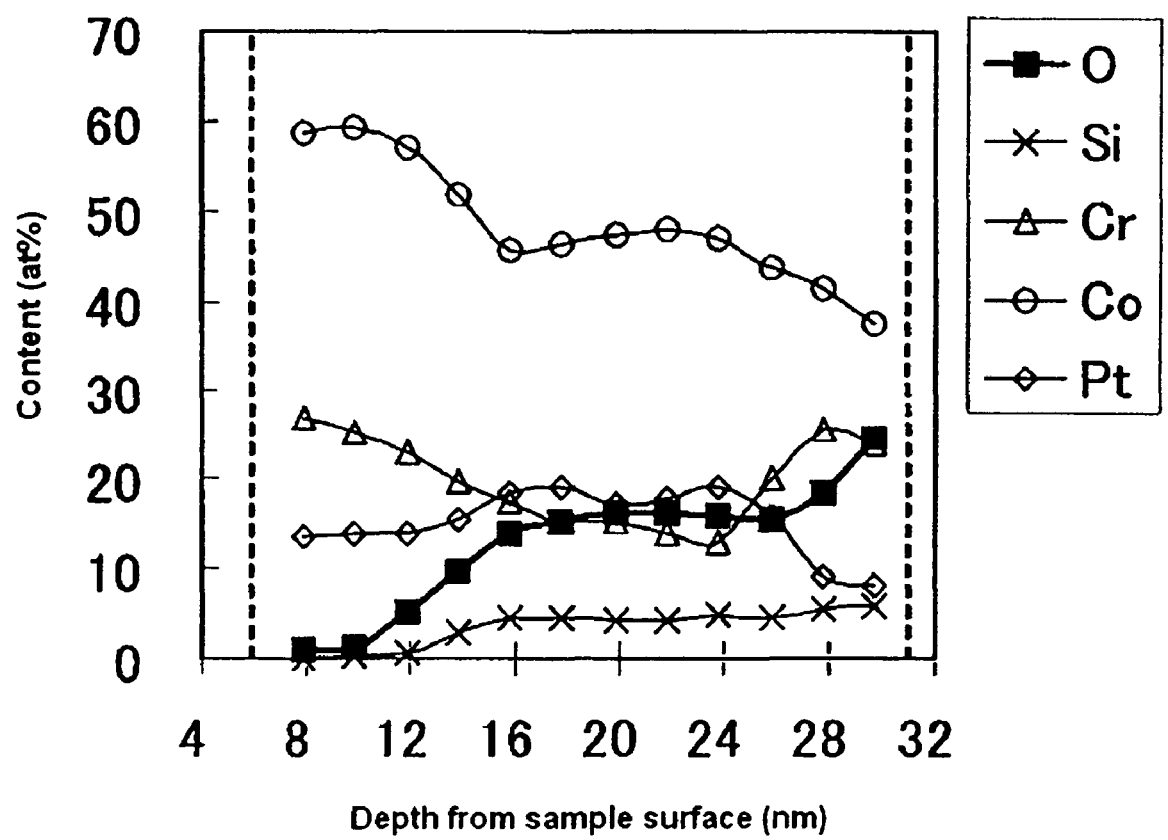
FIG. 10 shows a composition distribution diagram of a recording layer of sample 2P described in comparative example 2 of the present invention.
Figure 11:
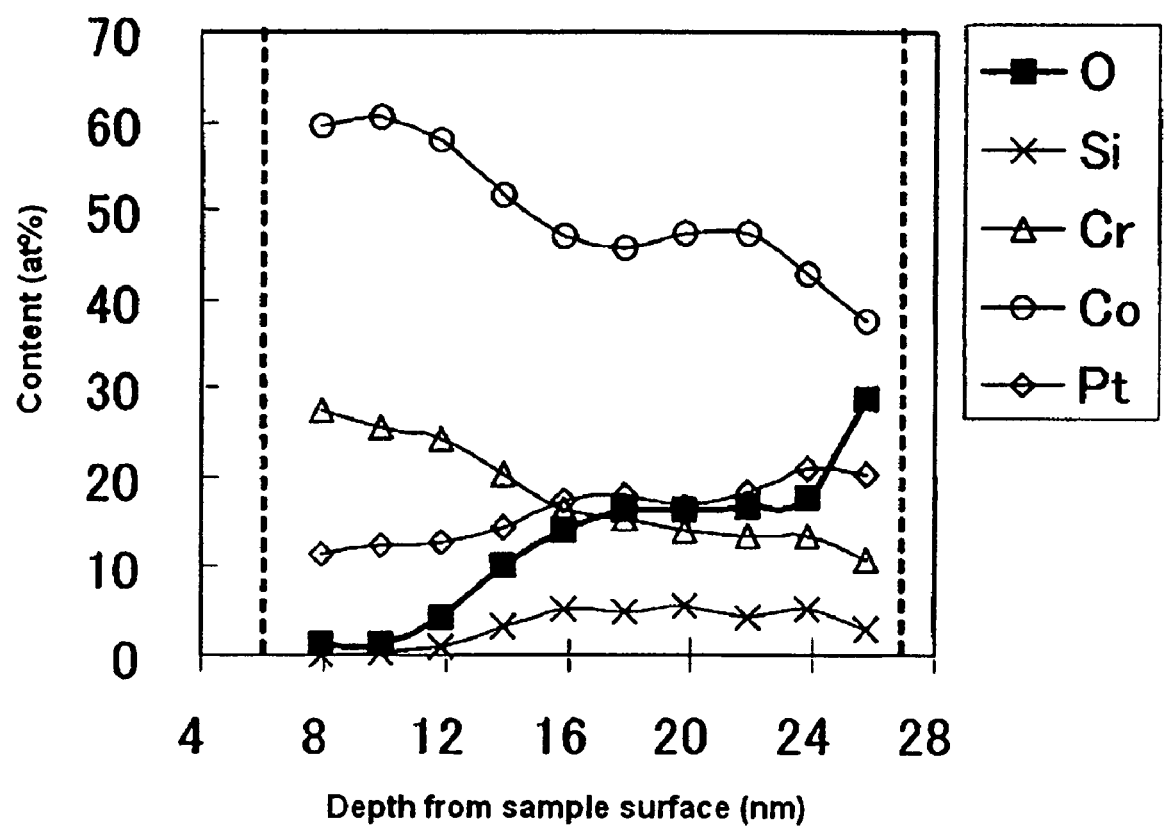
FIG. 11 shows a composition distribution diagram of a recording layer of sample 2Q described in comparative example 2 of the present invention.

The compositions of the recording layers of the sample 2P and the sample 2Q were obtained by using X-ray photoelectron spectroscopy similar to the embodiment 1. In common with the embodiment 1, the area from a depth where the C in the protective layer becomes 50 at % or less to the depth where the Ru in the intermediate layer becomes 50 at % or more was judged as the recording layer, and the concentration change of each element contained in the recording layer was obtained. FIGS. 10 and 11 shows the calculation results of the rates of contents of these elements focusing attention on only O, Si, Cr, Co, and Pt which are main elements of recording layer. The oxygen content decreases from the right end of the graph to the center, that is, from the interface with the intermediate layer to the protective layer side in the area in the vicinity of the interface with the intermediate layer, resulting in the distribution of the oxygen content being different from the embodiment 2.

According to the composition analyses of the samples in this comparative example, each oxygen content (mean value) is obtained from an area of 4 nm in the vicinity of the interface between the recording layer and the intermediate layer, an area of 4 nm in the vicinity of the center of the recording layer, and an area of 4 nm in the vicinity of the interface between the recording layer and the protective layer, and the results are shown in Table 5. The chromium content (mean value) in each area of depth of the recording layer is similarly obtained and shown in Table 6. In sample 2P, sample 2Q, sample 2S, and sample 2T, the oxygen content in the area in the vicinity of the interface between the recording layer and the intermediate layer is higher than the oxygen content in the area in the vicinity of the center of the recording layer and, in sample 2R, sample 2S, and sample 2U, the oxygen content in the area in the vicinity of the interface between the recording layer and the protective layer is higher than the oxygen content in the area in the vicinity of the center of the recording layer.

Focusing on the chromium content, a case where both the chromium content in the area in the vicinity of the interface between the recording layer and the intermediate layer and the chromium content in the area in the vicinity of the interface between the recording layer and the protective layer are higher (sample 2P and sample 2T), a case where only the chromium content in the area in the vicinity of the interface between the recording layer and the protective layer is higher (sample 2Q), a case where only the chromium content in the area in the vicinity of the interface between the recording layer and the intermediate layer is higher (sample 2R and sample 2U), and a case where both the chromium content in the area in the vicinity of the interface between the recording layer and the intermediate layer and the chromium content in the area in the vicinity of the interface between the recording layer and the protective layer are lower (sample 2S) are included in comparison with the chromium content in the vicinity of the center of the recording layer. That is, all cases are included with regard to the chromium content in the recording layer.

The results of the scratch test and the SNR evaluation which were performed on these samples are shown in Table 5. The scratch test and the SNR evaluation were carried out by using the same techniques as in the embodiment 1. Obviously deeper scratches were observed compared with the embodiment 2. It can be confirmed that the durability of the granular type perpendicular magnetic recording medium can be improved only when the oxygen content in the area in the vicinity of the interface between the recording layer and the intermediate layer is made lower than the oxygen content in the area in the vicinity of the center of the recording layer and the oxygen content in the area in the vicinity of the interface between the recording layer and the protective layer is made lower than the oxygen content in the vicinity of the center of the recording layer, and that it does not depend on the distribution of the chromium content in the recording layer. Moreover, the SNRs of sample 2P, sample 2Q, and sample 2T are greater than 20 dB and smaller than 22 dB, and they are smaller than the SNR of a sample in the embodiment 2. When the oxygen content in the area in the vicinity of the interface between the recording layer and the protective layer was made low, recording under a steep head magnetic field gradient becomes possible by decreasing the magnetic field for magnetic reversal of the recording layer and an SNR higher than 20 dB was obtained. However, since the oxygen content in the area in the vicinity of the interface between the recording layer and the intermediate layer was higher than the oxygen content in the area in the vicinity of the center of the recording layer, an SNR higher than 22 dB was not obtained even if the chromium content in the area in the vicinity of the interface between the recording layer and the intermediate layer was made higher than the chromium content in the area in the vicinity of the center of the recording layer.

TABLE 5

| | Oxygen content (at %) | | | | |
| --- | --- | --- | --- | --- | --- |
| Sample number | Near interface with intermediate layer | Center of recording layer | Near interface with protective layer | Scratch depth (nm) | SNR (dB) |
| 2P | 21.4 | 16.1 | 1.1 | 2.76 | 21.2 |
| 2Q | 23.1 | 16.2 | 1.3 | 2.80 | 20.3 |
| 2R | 6.7 | 15.8 | 16.2 | 3.14 | 12.5 |
| 2S | 21.7 | 16.5 | 16.9 | 3.68 | 13.2 |
| 2T | 18.2 | 14.2 | 2.1 | 2.67 | 21.2 |
| 2U | 5.7 | 16.1 | 16.3 | 3.18 | 13.1 |

TABLE 6

| | Chromium content (at %) | | |
| --- | --- | --- | --- |
| Sample number | Near interface with intermediate layer | Center of recording layer | Near interface with protective layer |
| 2P | 24.8 | 14.5 | 26.1 |
| 2Q | 12.0 | 14.7 | 26.4 |
| 2R | 33.4 | 14.4 | 14.0 |
| 2S | 15.6 | 17.8 | 17.3 |
| 2T | 32.2 | 18.7 | 20.1 |
| 2U | 32.9 | 15.2 | 14.7 |

When a perpendicular magnetic recording medium of this comparative example is installed in the same magnetic storage apparatus as the embodiment 1, an operation with 37.2 gigabits per square centimeter was impossible because bit errors occurred frequently in all samples. However, in sample 2P, sample 2Q, and sample 2T, operation with 31.0 gigabits per square centimeter could be confirmed. The test where the load, unload, and seek of the head are repeated 1.5 million times was performed for these three samples, resulting in bit errors occurring frequently and becoming inoperative. When it was disassembled to observe the medium surface, many scratches were observed in every sample.

In this embodiment, a means will be explained to obtain better recording/reproducing properties while excellent durability is maintained in a perpendicular magnetic recording medium having the features described in the embodiment 1. The feature is that the intermediate layer adjacent to the recording layer includes crystal grains mainly composed of ruthenium and crystal grain boundaries mainly composed of oxide. This is an approach for helping the formation of the segregation structure in the area in the vicinity of the interface between the recording layer and the intermediate layer.

Figure 12:
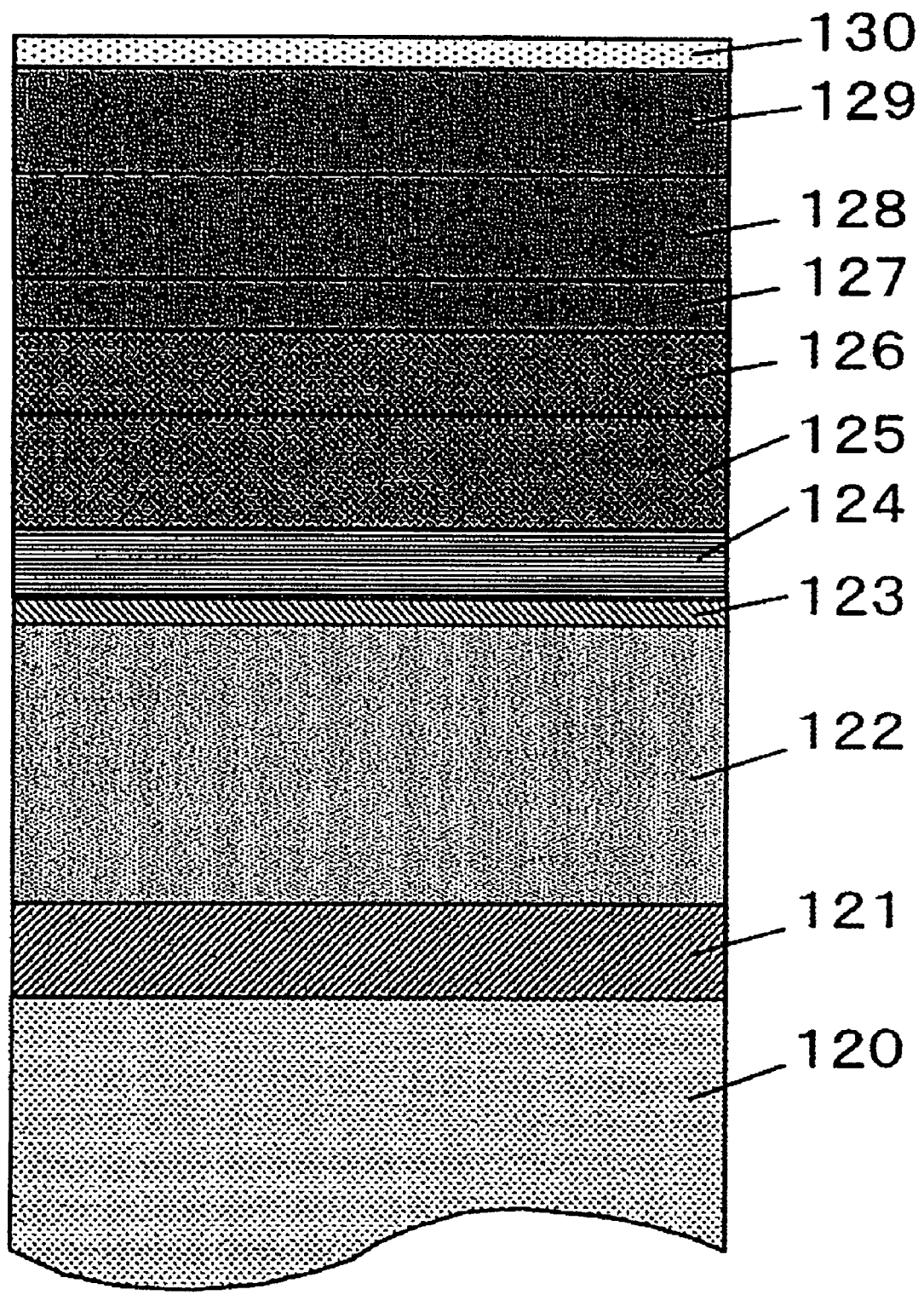
FIG. 12 is a schematic drawing of a layer configuration of a perpendicular magnetic recording medium described in embodiment 3 of the present invention.

FIG. 12 is a schematic drawing illustrating a cross-section of a perpendicular magnetic recording medium of this embodiment. A perpendicular magnetic recording medium of this embodiment is manufactured by using a sputtering apparatus which is the same as the embodiment 1 under similar conditions. An adhesion layer 121, a soft-magnetic underlayer 122, a seed layer 123, a first intermediate layer 124, a second intermediate layer 125, a third intermediate layer 126, a first recording layer 127, a second recording layer 128, a third recording layer 129, and a protective layer 130 were laminated, in order, over a substrate 120.

A glass substrate with a thickness of 0.635 mm and a diameter of 65 mm was used for the substrate 120; a 10 nm thick Al-50 at % Ti alloy film was formed as an adhesion layer 121; and a film having a structure where two 15 nm thick Fe-34 at % Co-10 at % Ta-5 at % Zr alloy films were laminated through a 0.5 nm thick Ru film was formed as the soft-magnetic underlayer 122. A 2 nm thick Ni-37.5 at % Ta alloy film was formed as the seed layer 123 and an 8 nm thick Ni-6 at % Cr alloy film was formed as the first intermediate layer 124. The film formation process up to this point was carried out by sputtering in a gas pressure of 1 Pa using argon as a sputtering gas. Next, a 12 nm thick Ru film was formed as the second intermediate layer 125. With regard to the Ru film, a 6 nm thick film was formed in a gas pressure of 1 Pa and a 4 nm thick film was laminated in a gas pressure of 4 Pa. A granular film where oxide was added to the Ru was formed as the third intermediate layer 126. Argon gas was used for the sputtering gas to form the second intermediate layer and the third intermediate layer. The recording layer is assumed to be a laminated structure of three layers, in which the first recording layer 127 and the second recording layer 128 were formed in a gas pressure of 5 Pa using two kinds of gasses, argon gas and a mixed gas where 10% oxygen is added to argon, and the third recording layer 129 was formed under the condition of a gas pressure of 1 Pa only using argon. The oxygen content in the recording layer was changed by changing the argon-oxygen gas flow ratio during the process. The protective layer 130 was formed by a sputtering technique using a carbon target in a mixed gas where nitrogen of 0.05 Pa was added in argon with a gas pressure of 0.6 Pa. The thickness of the protective layer was controlled to be 4 nm. Moreover, a 1 nm thick lubricant film was coated over the surface of the protective layer.

In sample 3A, a 2 nm thick granular film was formed as the third intermediate layer by using a target where 4 mol % of $SiO_2$ was added to Ru; a 2 nm thick film was formed as the first recording layer by using a target where 7 mol % of $SiO_2$ was added to a Co-20 at % Cr-18 at % Pt alloy under the condition of an argon-oxygen gas flow ratio of 3.3%; a 12 nm thick film was formed as the second recording layer by using a target where 7 mol % of $SiO_2$ was added to a Co-20 at % Cr-18 at % Pt alloy under the condition of an argon-oxygen gas flow ratio of 11.7%; and a 6 nm thick film was formed as the third recording layer by using a target of a Co-26 at % Cr-8 at % Pt-4 at % B alloy.

In sample 3B, a 2 nm thick granular film was formed as the third intermediate layer by using a target where 4 mol % of $TiO_2$ was added in Ru; a 2 nm thick film was formed as the first recording layer by using a target where 7 mol % of $TiO_2$ was added to a Co-20 at % Cr-18 at % Pt alloy under the condition of an argon-oxygen gas flow ratio of 3.3%; a 12 nm thick film was formed as the second recording layer by using a target where 7 mol % of $TiO_2$ was added to a Co-20 at % Cr-18 at % Pt alloy under the condition of an argon-oxygen gas flow ratio of 8.3%; and a 6 nm thick film was formed as the third recording layer by using a target of a Co-26 at % Cr-8 at % Pt-4 at % B alloy.

In sample 3C, a 2 nm thick granular film was formed as the third intermediate layer by using a target where 1.5 mol % of $Ta_2O_5$ was added to the Ru; a 2 nm thick film was formed as the first recording layer by using a target where 2.5 mol % of $Ta_2O_5$ was added to a Co-20 at % Cr-18 at % Pt alloy under the condition of an argon-oxygen gas flow ratio of 3.3%; a 12 nm thick film was formed as the second recording layer by using a target where 2.5 mol % of $Ta_2O_5$ was added to a Co-20 at % Cr-18 at % Pt alloy under the condition of an argon-oxygen gas flow ratio of 11.7%; and a 6 nm thick film was formed as the third recording layer by using a target of a Co-26 at % Cr-8 at % Pt-4 at % B alloy.

According to the composition analyses of the samples in this embodiment, each oxygen content (mean value) is obtained from an area of 4 nm in the vicinity of the interface between the recording layer and the intermediate layer, an area of 4 nm in the vicinity of the center of the recording layer, and an area of 4 nm in the vicinity of the interface between the recording layer and the protective layer, and the results are shown in Table 7. In all samples in this embodiment, it could be confirmed that the oxygen content in the area in the vicinity of the interface between the recording layer and the intermediate layer is lower than the oxygen content in the area in the vicinity of the center of the recording layer, and that the oxygen content in the area in the vicinity of the interface between the recording layer and the protective layer is lower than the oxygen content in the area in the vicinity of the center of the recording layer. The results of the scratch test and the SNR evaluation which were performed in these samples are shown in Table 7. The scratch test and the SNR evaluation were carried out by using the same techniques as in the embodiment 1. In samples of this embodiment, all scratch depths can be controlled to be smaller than 1.5 nm and it is confirmed that they have excellent durability. Moreover, all SNRs are greater than 22 dB and have excellent recording/reproducing properties.

TABLE 7

| | Oxygen content (at %) | | | | |
|---|---|---|---|---|---|
| Sample number | Near interface with intermediate layer | Center of recording layer | Near interface with protective layer | Scratch depth (nm) | SNR (dB) |
| 3A | 7.8 | 14.9 | 1.9 | 1.39 | 22.6 |
| 3B | 8.2 | 12.3 | 1.8 | 1.17 | 22.8 |
| 3C | 8.3 | 15.2 | 2.1 | 1.33 | 22.9 |

Operation of 37.2 gigabits per square centimeter could be confirmed by installing a perpendicular magnetic recording medium of this embodiment in a magnetic storage apparatus and controlling the head flying height to be 8 nm, the linear recording density per centimeter to be 472,400 bits, and the track density per centimeter to be 78,740 tracks. Moreover, after repeating the load, unload, and seek of the head 1.5 million times, the bit error count was 10 or less per single face. According to embodiments of the present invention, a magnetic storage apparatus with high reliability where high density recording is possible, can be obtained.

In this embodiment, a process is applied to at least one selected from the substrate, the underlayer, the intermediate layer, and the recording layer, and it can be applied to a so-called discrete track medium or a patterned medium where the recording layer is periodically delimited in-plane of the disk face to be a discontinuous structure, so that the durability can be improved while excellent recording/reproducing properties are ensured. Since these media rather have a discontinuous structure by delimiting the recording layer in-plane of the disk, improvement of the durability is highly required and the role that embodiments of the invention play to improve the durability is great.

A perpendicular magnetic recording medium of this comparative example was manufactured by using entirely the same materials under the same process conditions as the embodiment 3 with regard to the configuration elements except for the recording layer. With regard to the recording layer, the argon-oxygen gas flow ratios while forming the first recording layer were controlled to be 11.7%, 8.3%, and 11.7% for sample 3P, sample 3Q, and sample 3R, respectively. Except for this, the conditions and materials for manufacturing the recording layer of sample 3P, sample 3Q, and sample 3R were the same as those of sample 3A, sample 3B, and sample 3C, respectively.

According to the composition analyses of the samples in this comparative example, each oxygen content (mean value) is obtained from an area of 4 nm in the vicinity of the interface between the recording layer and the intermediate layer, an area of 4 nm in the vicinity of the center of the recording layer, and an area of 4 nm in the vicinity of the interface between the recording layer and the protective layer, and the results are shown in Table 8. In all samples in this comparative example, the oxygen content in the area in the vicinity of the interface between the recording layer and the intermediate layer is higher than the oxygen content in the area in the vicinity of the center of the recording layer. The results of the scratch test and the SNR evaluation which were performed in these samples are shown in Table 8. The scratch test and the SNR evaluation were carried out by using the same techniques as in the embodiment 1. In the samples in this comparative example, all scratches are deeper than 2.5 nm and there is a problem with the durability. Moreover, all SNRs are greater than 20 dB but do not reach 22 dB.

TABLE 8

| | Oxygen content (at %) | | | | |
|---|---|---|---|---|---|
| Sample number | Near interface with intermediate layer | Center of recording layer | Near interface with protective layer | Scratch depth (nm) | SNR (dB) |
| 3P | 15.2 | 14.8 | 1.7 | 2.70 | 20.7 |
| 3Q | 15.1 | 12.1 | 1.8 | 2.52 | 20.0 |
| 3R | 15.7 | 15.4 | 1.9 | 2.76 | 21.0 |

When a perpendicular magnetic recording medium of this comparative example is installed in the same magnetic storage apparatus as in the embodiment 1, an operation with 31.0 gigabits per square centimeter could be confirmed although operation with 37.2 gigabits per square centimeter was impossible because frequent bit errors occurred. The test where the load, unload, and seek of the head are repeated 1.5 million times was performed for these samples, resulting in bit errors occurring frequently and becoming inoperative. When it was disassembled to observe the medium surface, many scratches were observed in each sample.

In this embodiment, an approach will be explained to obtain better recording/reproducing properties while excellent durability is maintained in a perpendicular magnetic recording medium having the features described in the embodiment 1. The feature is that the recording layer contains platinum, the platinum content changes along the film thickness direction; the platinum content in the area in the vicinity of the interface between the recording layer and the intermediate layer is lower than the platinum content in the area in the vicinity of the center of the recording layer; and a non-magnetic layer is formed between the area in the vicinity of the interface with the intermediate layer and the area in the vicinity of the center of the recording layer. It is an approach which makes the area an assist layer for magnetic reversal composed of a material which contains a low platinum content and has small magnetic anisotropy by utilizing a low oxygen content in the area in the vicinity of the interface with the interface. In this case, the interlayer magnetic coupling is made weaker by an appropriate amount by forming a thin non-magnetic layer between it and the upper main recording layer, resulting in the assist effect of the magnetic reversal becoming stronger.

Figure 13:
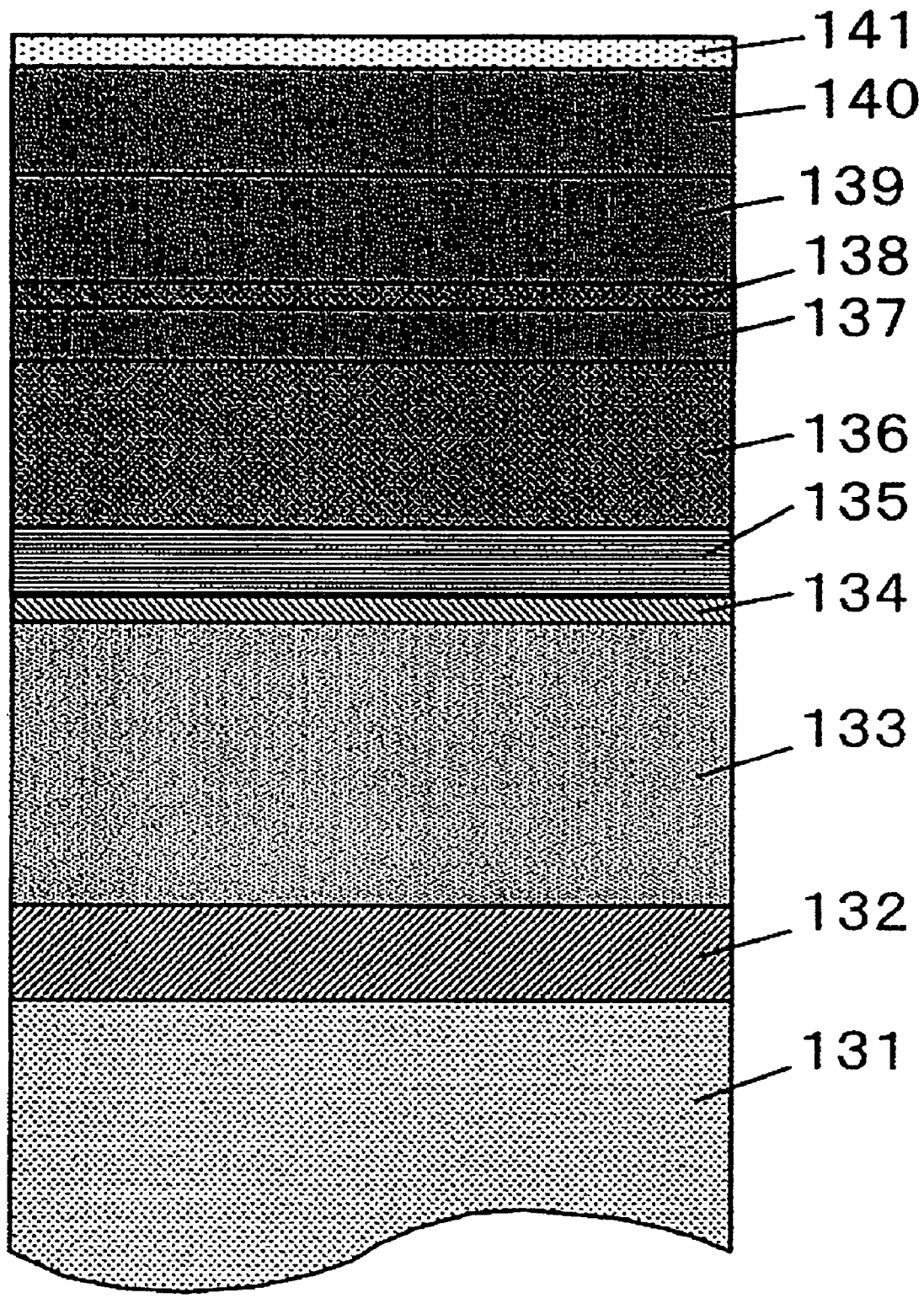
FIG. 13 is a schematic drawing of a layer configuration of a perpendicular magnetic recording medium described in embodiment 4 of the present invention.

FIG. 13 is a schematic drawing illustrating a cross-section of a perpendicular magnetic recording medium of this embodiment. A perpendicular magnetic recording medium of this embodiment is manufactured by using a sputtering apparatus which is the same as the embodiment 1 under similar conditions. An adhesion layer 132, a soft-magnetic underlayer 133, a seed layer 134, a first intermediate layer 135, a second intermediate layer 136, a first recording layer 137, a non-magnetic layer 138, a second recording layer 139, a third recording layer 140, and a protective layer 141 were laminated, in order, over a substrate 131.

The substrate 131, the adhesion layer 132, the soft-magnetic underlayer 133, the seed layer 134, the first intermediate layer 135, and the second intermediate layer 136 were all formed of the same materials and under the same conditions as the embodiment 2. The recording layer is assumed to be a laminated structure of four layers, in which the first recording layer 137 and the second recording layer 139 were formed in a gas pressure of 5 Pa, and the non-magnetic layer 138 and the third recording layer 140 were formed in a gas pressure of 1 Pa. Only argon gas was used for the sputtering gas to form the first recording layer, the non-magnetic layer, and the third intermediate layer, and two kinds of gases which were argon and a mixed gas, where 10% oxygen was mixed with argon, were used for the sputtering gas to form the second recording layer. The protective layer 141 is formed by a sputtering technique using a carbon target in a mixed gas where nitrogen at 0.05 Pa is added to argon with a gas pressure of 0.6 Pa. The thickness of the protective layer was controlled to be 4 nm. Moreover, a 1 nm thick lubricant film was coated over the surface of the protection layer.

In sample 4A, a 6 nm thick film was formed as the first recording layer by using a target where 5 mol % of SiO2 was added to a Co-11 at % Cr-4 at % Pt alloy, a 0.8 nm thick film was formed as the non-magnetic layer by using a target of a Co-40 at % Ru-20 at % Cr alloy, a 10 nm thick film was formed as the second recording layer by using a target where 7 mol % of SiO2 was added to a Co-15 at % Cr-20 at % Pt alloy under the condition of an argon-oxygen flow ratio of 11.7%, and a 3 nm thick film was formed as the third recording layer by using a target of a Co-25 at % Cr-6 st % Pt-6 at % B alloy.

In sample 4B, a 4 nm thick film was formed as the first recording layer by using a target where 5 mol % of SiO2 was added to a Co-7 at % Cr alloy, a 1.0 nm thick film was formed as the non-magnetic layer by using a target of a Co-50 at % Ru alloy, an 8 nm thick film was formed as the second recording layer by using a target where 8 mol % of SiO2 was added to a Co-13 at % Cr-18 at % Pt alloy under the condition of an argon-oxygen flow ratio of 11.7%, and, as the third recording layer, a 2 nm thick film was laminated by using a target of a Co-19 at % Cr-8 at % Pt-4 at % B alloy over a 2 nm thick film formed by using a target of a Co-28 at % Cr-6 at % Pt alloy.

According to the composition analyses of the samples in this embodiment, each oxygen content (mean value) is obtained from an area of 4 nm in the vicinity of the interface between the recording layer and the intermediate layer, an area of 4 nm in the vicinity of the center of the recording layer, and an area of 4 nm in the vicinity of the interface between the recording layer and the protective layer, and the results are shown in Table 9. The platinum content (mean value) in each area of depth of the recording layer is similarly obtained and shown in Table 10. In all samples in this embodiment, it is understood that the oxygen content in the area in the vicinity of the interface between the recording layer and the intermediate layer is lower than the oxygen content in the area in the vicinity of the center of the recording layer, and that the oxygen content in the area in the vicinity of the interface between the recording layer and the protective layer is lower than the oxygen content in the area in the vicinity of the center of the recording layer. Moreover, in all samples in this embodiment, it is understood that the platinum content in the area in the vicinity between the recording layer and the intermediate layer is lower than the platinum content in the area in the vicinity of the center of the recording layer. The results of the scratch test and the SNR evaluation which were performed on these samples are shown in Table 9. The scratch test and the SNR evaluation were carried out by using the same techniques as in the embodiment 1. In the samples of this embodiment, all scratch depths can be controlled to be smaller than 1.5 nm and they have excellent durability. Moreover, the SNR is greater than 23 dB and it has extremely excellent recording/reproducing properties.

TABLE 9

| | Oxygen content (at %) | | | | |
| --- | --- | --- | --- | --- | --- |
| Sample number | Near interface with intermediate layer | Center of recording layer | Near interface with protective layer | Scratch depth (nm) | SNR (dB) |
| 4A | 6 | 15.2 | 2.3 | 1.32 | 23.5 |
| 4B | 6.3 | 15.4 | 2.4 | 1.35 | 23.4 |

TABLE 10

| | Platinum content (at %) | | |
| --- | --- | --- | --- |
| Sample number | Near interface with intermediate layer | Center of recording layer | Near interface with protective layer |
| 4A | 4.7 | 21.2 | 7.0 |
| 4B | 0.0 | 18.9 | 8.1 |

Operation of 37.2 gigabits per square centimeter could be confirmed by installing a perpendicular magnetic recording medium of this embodiment in a magnetic storage apparatus and controlling the head flying height to be 8 nm, the linear recording density per centimeter to be 472,400 bits, and the track density per centimeter to be 78,740 tracks. Moreover, after repeating the load, unload, and seek of the head 1.5 million times, the bit error count was 10 or less per single face. According to embodiments of the present invention, a magnetic storage apparatus with high reliability where high density recording is possible, can be obtained.

In this embodiment, a process is applied to at least one selected from the substrate, the underlayer, the intermediate layer, and the recording layer, and it can be applied to a so-called discrete track medium or a patterned medium where the recording layer is periodically delimited in-plane of the disk face to be a discontinuous structure, so that the durability can be improved while excellent recording/reproducing properties are ensured. Since these media rather have a discontinuous structure by delimiting the recording layer in-plane of the disk, improvement of the durability is highly required and the role that embodiments of the invention play to improve the durability is great.

According to embodiments of the present invention, since the durability of a perpendicular magnetic recording medium can be improved while excellent recording/reproducing properties is ensured, a perpendicular magnetic recording medium of embodiments of the present invention can be applied to a magnetic disk apparatus where high reliability is required. For instance, a perpendicular magnetic recording medium according to embodiments of the present invention is suitable for a small and large capacity magnetic disk apparatus which can be used for mobile devices or the like.

What is claimed is:

1. A perpendicular magnetic recording medium comprising: an underlayer, an intermediate layer, a recording layer, and a protective layer, deposited, in order over a substrate,
    wherein the recording layer includes a layer which consists of crystal grains mainly composed of cobalt and crystal grain boundaries mainly composed of an oxide,
    wherein an oxygen content of the recording layer changes along the film thickness direction, the oxygen content in an area of about 4 nm in the vicinity of the interface between the recording layer and the intermediate layer is lower than the oxygen content of an area of about 4 nm in the vicinity of the center of the recording layer, and the oxygen content in an area of 4 nm from the interface between the recording layer and the protective layer is lower than 5 at % and lower than the oxygen content in the area of about 4 nm in the vicinity of the center of the recording layer, and wherein the recording layer contains chromium, a mean chromium content in the recording layer changes along the film thickness direction, and the mean chromium content in an area of about 4 nm in the vicinity of the interface between the recording layer and the intermediate layer is higher than the mean chromium content in an area of about 4 nm in the vicinity of the center of the recording layer.

2. A perpendicular magnetic recording medium comprising:

an underlayer, an intermediate layer, a recording layer, and a protective layer, deposited, in order, over a substrate, wherein the recording layer includes a layer which consists of crystal grains mainly composed of cobalt and crystal grain boundaries mainly composed of an oxide, and wherein, in an area of about 4 nm in the vicinity of the interface between the recording layer and the intermediate layer, an oxygen content increases from the interface with the intermediate layer to the protective layer side and, in an area of from the interface between the recording layer and the protective layer, the oxygen content is lower than 5 at % and increases from the interface with the protective layer to the intermediate layer side, and wherein the recording layer contains chromium, a mean chromium content in the recording layer changes along the film thickness direction, and the mean chromium content in an area of about 4 nm in the vicinity of the interface between the recording layer and the intermediate layer is higher than the mean chromium content in an area of about 4 nm in the vicinity of the center of the recording layer.

3. The perpendicular magnetic recording medium according to claim 1, wherein the intermediate layer includes a layer which is formed adjacent to the recording layer and consists of crystal grains mainly composed of ruthenium and crystal grain boundaries mainly composed of the oxide.

4. The perpendicular magnetic recording medium according to claim 1, wherein the recording layer contains platinum and the platinum content of the recording layer changes along the film thickness direction, the platinum content in an area of about 4 nm in the vicinity of the interface between the recording layer and the intermediate layer is lower than the platinum content in an area of about 4 nm in the vicinity of the center of the recording layer, and a non-magnetic layer is formed between the area in the vicinity of interface of the recording layer and the intermediate layer and the area in the vicinity of center of the recording layer.

5. The perpendicular magnetic recording medium according to claim 1, wherein the recording layer has a discontinuous structure periodically delimited in a film plane.

6. The perpendicular magnetic recording medium according to claim 2, wherein the intermediate layer includes a layer which is formed adjacent to the recording layer and consists of crystal grains mainly composed of ruthenium and crystal grain boundaries mainly composed of the oxide.

7. The perpendicular magnetic recording medium according to claim 2, wherein the recording layer contains platinum and the platinum content of the recording layer changes along the film thickness direction, the platinum content in an area of about 4 nm in the vicinity of the interface between the recording layer and the intermediate layer is lower than the platinum content in an area of about 4 nm in the vicinity of the center of the recording layer, and a non-magnetic layer is formed between the area in the vicinity of interface of the recording layer and the intermediate layer and the area in the vicinity of center of the recording layer.

8. The perpendicular magnetic recording medium according to claim 2, wherein the recording layer has a discrete structure periodically delimited in a film plane.

9. A magnetic storage apparatus comprising:

a magnetic recording medium;

a means for driving the magnetic recording medium in a recording direction;

a magnetic head including a recording unit and a read element;

a means to drive the magnetic head relative to a perpendicular magnetic recording medium; and a signal processing unit to process input signals and output signals to and from the magnetic head, wherein the magnetic recording medium includes a substrate on which an underlayer, an intermediate layer, a recording layer, and a protective layer are deposited, in order, the recording layer includes a layer consisting of crystal grains mainly composed of cobalt and crystal grain boundaries mainly composed of an oxide, and wherein an oxygen content of the recording layer changes along the film thickness direction, the oxygen content in an area of about 4 nm in the vicinity of the interface between the recording layer and the intermediate layer is lower than the oxygen content of an area of about 4 nm in the vicinity of the center of the recording layer, and the oxygen content in an area of 4 nm from the interface between the recording layer and the protective layer is lower than 5 at % and lower than the oxygen content of the area of about 4 nm in the vicinity of the center of the recording layer, and wherein the recording layer contains chromium, the mean chromium content in the recording layer changes along the film thickness direction, and the mean chromium content in an area of about 4 nm in the vicinity of the interface between the recording layer and the intermediate layer is higher than the mean chromium content in an area of about 4 nm in the vicinity of the center of the recording layer.

10. The magnetic storage apparatus according to claim 9, wherein the intermediate layer includes a layer which is formed adjacent to the recording layer and consists of crystal grains mainly composed of ruthenium and crystal grain boundaries mainly composed of the oxide.

11. The magnetic storage apparatus according to claim 9, wherein
- the recording layer contains platinum and a platinum content of the recording layer changes along the film thickness direction,
- the platinum content in an area of about 4 nm in the vicinity of the interface between the recording layer and the intermediate layer is lower than the platinum content in an area of about 4 nm in the vicinity of the center of the recording layer, and
- a non-magnetic layer is formed between the area in the vicinity of interface of the recording layer and the intermediate layer and the area in the vicinity of center of the recording layer.

12. A magnetic storage apparatus according to claim 9, wherein
- the recording layer has a discontinuous structure periodically delimited in the film plane.

13. A magnetic storage apparatus comprising:
- a magnetic recording medium;
- a means for driving the magnetic recording medium in the recording direction;
- a magnetic head including a recording unit and a reading element;
- a means to drive the magnetic head relative to the magnetic recording medium; and
- a signal processing unit to process input signals and output signals to and from the magnetic head,
- wherein the magnetic recording medium includes a substrate on which an underlayer, an intermediate layer, a recording layer, and a protective layer are deposited, in order, and the recording layer includes a layer consisting of crystal grains mainly composed of cobalt and crystal grain boundaries mainly composed of an oxide, and
- wherein, in an area of about 4 nm in the vicinity of the interface between the recording layer to the intermediate layer, an oxygen content increases from the interface with the intermediate layer to the protective layer side, and in area of from the interface between the recording layer and the protective layer, the oxygen content is lower than 5 at % and increases from the interface with the protective layer to the intermediate layer side, and wherein
- the recording layer contains chromium,
- the mean chromium content in the recording layer changes along the film thickness direction, and
- the mean chromium content in an area of about 4 nm in the vicinity of the interface between the recording layer and the intermediate layer is higher than the mean chromium content in an area of about 4 nm in the vicinity of the center of the recording layer.

14. The magnetic storage apparatus according to claim 13, wherein the intermediate layer includes a layer which is formed adjacent to the recording layer and consists of crystal grains mainly composed of ruthenium and crystal grain boundaries mainly composed of the oxide.

15. The magnetic storage apparatus according to claim 13, wherein
- the recording layer contains platinum and the platinum content of the recording layer changes along the film thickness direction,
- the platinum content in an area of about 4 nm in the vicinity of the interface between the recording layer and the intermediate layer is lower than the platinum content in an area of about 4 nm in the vicinity of the center of the recording layer, and
- a non-magnetic layer is formed between the area in the vicinity of interface of the recording layer and the intermediate layer and the area in the vicinity of center of the recording layer.

16. A magnetic storage apparatus according to claim 13, wherein the recording layer has a discontinuous structure periodically delimited in a film plane.

* * * * *